United States Patent
Lee et al.

(10) Patent No.: US 12,261,968 B2
(45) Date of Patent: Mar. 25, 2025

(54) ELECTRONIC DEVICE, AND METHOD FOR CONTROLLING AND OPERATING FOLDABLE DISPLAY

(71) Applicant: Samsung Electronics Co., Ltd., Suwon-si (KR)

(72) Inventors: Seo Lee, Suwon-si (KR); Seungchan Lee, Suwon-si (KR); Jaok Koo, Suwon-si (KR); Jonghoon Won, Suwon-si (KR); Yongsang Yun, Suwon-si (KR); Dasom Lee, Suwon-si (KR); Yunjeong Ji, Suwon-si (KR); Hoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 17/752,202

(22) Filed: May 24, 2022

(65) Prior Publication Data
US 2022/0286541 A1    Sep. 8, 2022

Related U.S. Application Data

(63) Continuation of application No. PCT/KR2020/016461, filed on Nov. 20, 2020.

(30) Foreign Application Priority Data

Nov. 26, 2019 (KR) .................. 10-2019-0153033

(51) Int. Cl.
*G06F 1/16* (2006.01)
*H04M 1/02* (2006.01)

(52) U.S. Cl.
CPC ........ *H04M 1/0216* (2013.01); *G06F 1/1616* (2013.01); *G06F 1/1641* (2013.01);
(Continued)

(58) Field of Classification Search
None
See application file for complete search history.

(56) References Cited

U.S. PATENT DOCUMENTS 8,082,631 B2 * 12/2011 Eromaki ............... G06F 1/1616
16/370
10,564,674 B2 * 2/2020 Fujimoto ............. G06F 1/1649
(Continued)

FOREIGN PATENT DOCUMENTS

JP    2013-013038 A    1/2013
JP    2014-068287 A    4/2014
(Continued)

OTHER PUBLICATIONS

Korean Office Action dated Jul. 19, 2024, issued in Korean Application No. 10-2019-0153033.
(Continued)

*Primary Examiner* — Anthony M Haughton
*Assistant Examiner* — Rashen E Morrison
(74) *Attorney, Agent, or Firm* — Jefferson IP Law, LLP

(57) ABSTRACT

An electronic device is provided. The electronic device includes a foldable housing, a flexible display, at least one camera, at least one sensor and at least one processor, wherein the foldable housing includes a first housing having a first surface facing a first direction and a second surface facing a second direction opposite to the first direction, a first connecting member which is connected to a side surface of the first housing and which can be folded in a first rotating direction and unfolded in a second rotating direction, a second housing which is connected to the first connecting member and has a third surface facing the first direction and a fourth surface facing the second direction, and in which the flexible display is positioned on the third surface, a second connecting member connected to the side surface of the second housing, and a third housing which is connected to
(Continued)

the second connecting member and has a fifth surface facing the first direction and a sixth surface facing the second direction.

16 Claims, 32 Drawing Sheets

(52) U.S. Cl.
CPC .......... *G06F 1/1652* (2013.01); *G06F 1/1681* (2013.01); *H04M 1/0264* (2013.01); *H04M 1/0268* (2013.01); *H04M 2201/38* (2013.01)

(56) References Cited

U.S. PATENT DOCUMENTS

| | | | |
|---|---|---|---|
| 11,567,532 B2* | 1/2023 | Jung | G06F 3/0481 |
| 2010/0064244 A1* | 3/2010 | Kilpatrick, II | H04M 1/0243 |
| | | | 345/1.3 |
| 2015/0248149 A1 | 9/2015 | Yamazaki et al. | |
| 2016/0170379 A1* | 6/2016 | Zhang | G04G 9/0029 |
| | | | 368/239 |
| 2017/0025634 A1 | 1/2017 | Jeong | |
| 2017/0169741 A1 | 6/2017 | Lim | |
| 2017/0295654 A1 | 10/2017 | Choi et al. | |
| 2020/0249722 A1* | 8/2020 | Cha | G06F 1/1681 |

FOREIGN PATENT DOCUMENTS

| | | | |
|---|---|---|---|
| JP | 2014068287 | * | 4/2014 |
| JP | 2015-180993 A | | 10/2015 |
| JP | 2015180993 | * | 10/2015 |
| JP | 2017-188027 A | | 10/2017 |
| JP | 2017188027 | * | 10/2017 |
| KR | 10-0534124 B1 | | 12/2005 |
| KR | 10-2015-0060278 A | | 6/2015 |
| KR | 10-1779012 B1 | | 9/2017 |
| KR | 10-2017-0117277 A | | 10/2017 |

OTHER PUBLICATIONS

Decision of Rejection dated Oct. 11, 2024, issued in Korean Application No. 10-2019-0153033.

* cited by examiner

ELECTRONIC DEVICE, AND METHOD FOR CONTROLLING AND OPERATING FOLDABLE DISPLAY

CROSS-REFERENCE TO RELATED APPLICATION(S)

This application is a continuation application, claiming priority under § 365(c), of an International application No. PCT/KR2020/016461, filed on Nov. 20, 2020, which is based on and claims the benefit of a Korean patent application number 10-2019-0153033, filed on Nov. 26, 2019, in the Korean Intellectual Property Office, the disclosure of which is incorporated by reference herein in its entirety.

BACKGROUND

1. Field

The disclosure relates to an electronic device and a method for controlling and operating a foldable display. More particularly, the disclosure relates to an electronic device and a method for controlling and operating a foldable display which allows the electronic device to be operated with a display size expanded.

2. Description of Related Art

With the development of mobile communication and hardware/software technologies, a portable electronic device (hereinafter, referred to as an electronic device) represented by a smart phone has evolved and comes to be equipped with various functions. The electronic device may include a touch screen-based display to allow a user to easily access various functions, and may provide screens of various applications through the display.

Recently, in order to increase portability, a display that is fully foldable by evolving from a flexible form has been developed. An electronic device having such a foldable display can use a large-area display in an unfolded state, and improve both usability and portability because the overall volume of the electronic device is reduced in a folded state.

The above information is presented as background information only to assist with an understanding of the disclosure. No determination has been made, and no assertion is made, as to whether any of the above might be applicable as prior art with regard to the disclosure.

SUMMARY

Although a recently appearing foldable electronic device including the flexible display has an in-folding or out-folding structure, it has difficulty in expanding the size of the display when unfolded.

In addition, the foldable electronic device including the flexible display has difficulty in maintaining a certain thickness while expanding the size of the display, and has difficulty in mounting a camera, a sensor, and the like.

Aspects of the disclosure are to address at least the above-mentioned problems and/or disadvantages and to provide at least the advantages described below. Accordingly, an aspect of the disclosure is to provide an electronic device and a method for controlling and operating a foldable display which allows the electronic device to be operated with a display size expanded.

Another aspect of the disclosure is to provide an electronic device and a method for controlling and operating a foldable display which allows the electronic device to be operated in a combination of in-folding and out-folding structures.

Additional aspects will be set forth in part in the description which follows and, in part, will be apparent from the description, or may be learned by practice of the presented embodiments.

In accordance with an aspect of the disclosure, an electronic device is provided. The electronic device includes a foldable housing, a flexible display, at least one camera, at least one sensor, and a processor. The foldable housing includes a first housing having a first surface facing a first direction and a second surface facing a second direction opposite to the first direction, wherein the first and second surfaces are spaced apart from each other by a first length, and the flexible display is positioned on the first surface, a first connecting member connected to a side surface of the first housing, being foldable in a first rotational direction, and being unfoldable in a second rotational direction, a second housing connected to the first connecting member and having a third surface facing the first direction and a fourth surface facing the second direction, wherein the flexible display is positioned on the third surface, a second connecting member having a thickness corresponding to the first length, connected to a side surface of the second housing, being foldable in the second rotational direction, and being unfoldable in the first rotational direction, and a third housing connected to the second connecting member and having a fifth surface facing the first direction and a sixth surface facing the second direction, wherein the flexible display is positioned on the fifth surface. In a state that the second housing and the third housing are folded so that the fourth surface and the sixth surface face each other, a distance between the third surface and the fifth surface may be the first length.

According to various embodiments of the disclosure, the electronic device and the method for controlling and operating the foldable display may increase the display size and thereby expand the variety of content used in the electronic device.

According to various embodiments of the disclosure, the electronic device and the method for controlling and operating the foldable display may expand the size of the flexible display by operating the electronic device in a combination of in-folding and out-folding structures.

According to various embodiments of the disclosure, the electronic device and the method for controlling and operating the foldable display may utilize some portions of the expanded foldable display without adding a separate display by combining in-folding and out-folding hinge structures.

According to various embodiments of the disclosure, (the electronic device and the method for controlling and operating the foldable display may allow the extended foldable housing to be placed by combining the in-folding and out-folding hinge structures, thereby keeping the thickness of the electronic device constant while having the expanded display area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
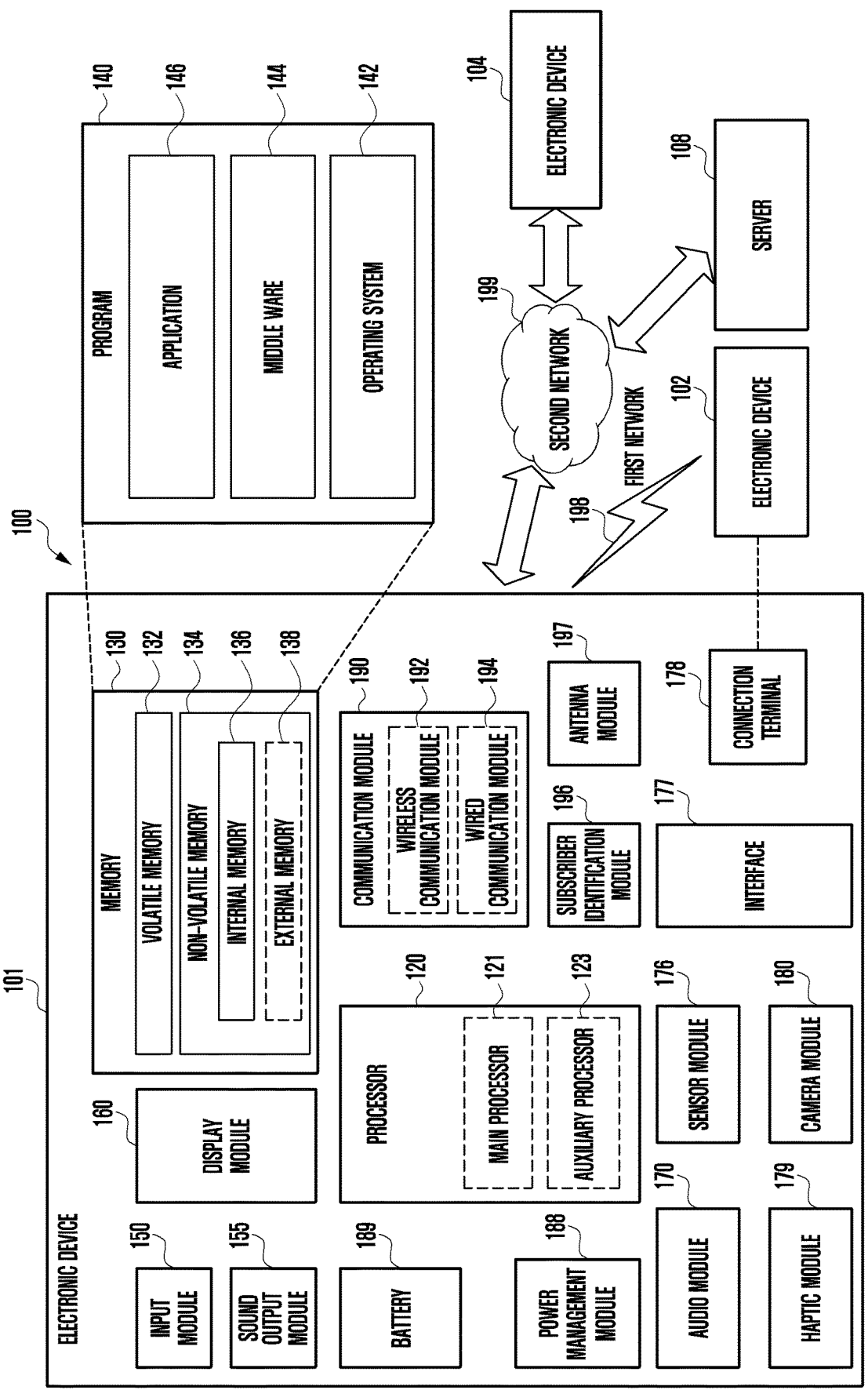
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphical processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
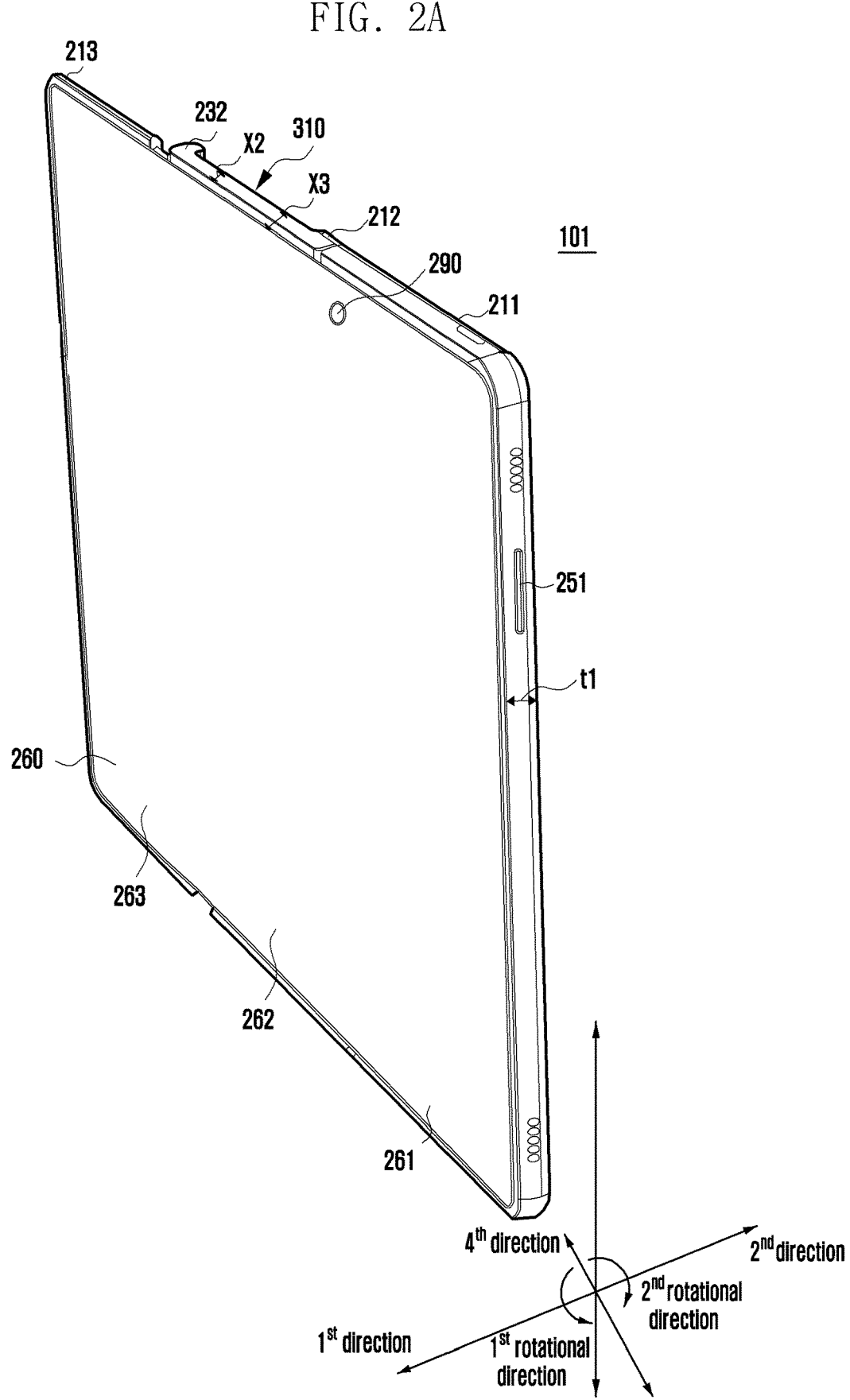
FIG. 2A is a diagram illustrating a front stereoscopic view of an unfolding state or open state of an electronic device according to an embodiment of the disclosure.

FIG. 2A is a diagram illustrating a front stereoscopic view of an unfolding state or open state of an electronic device according to an embodiment of the disclosure.

Figure 2B:
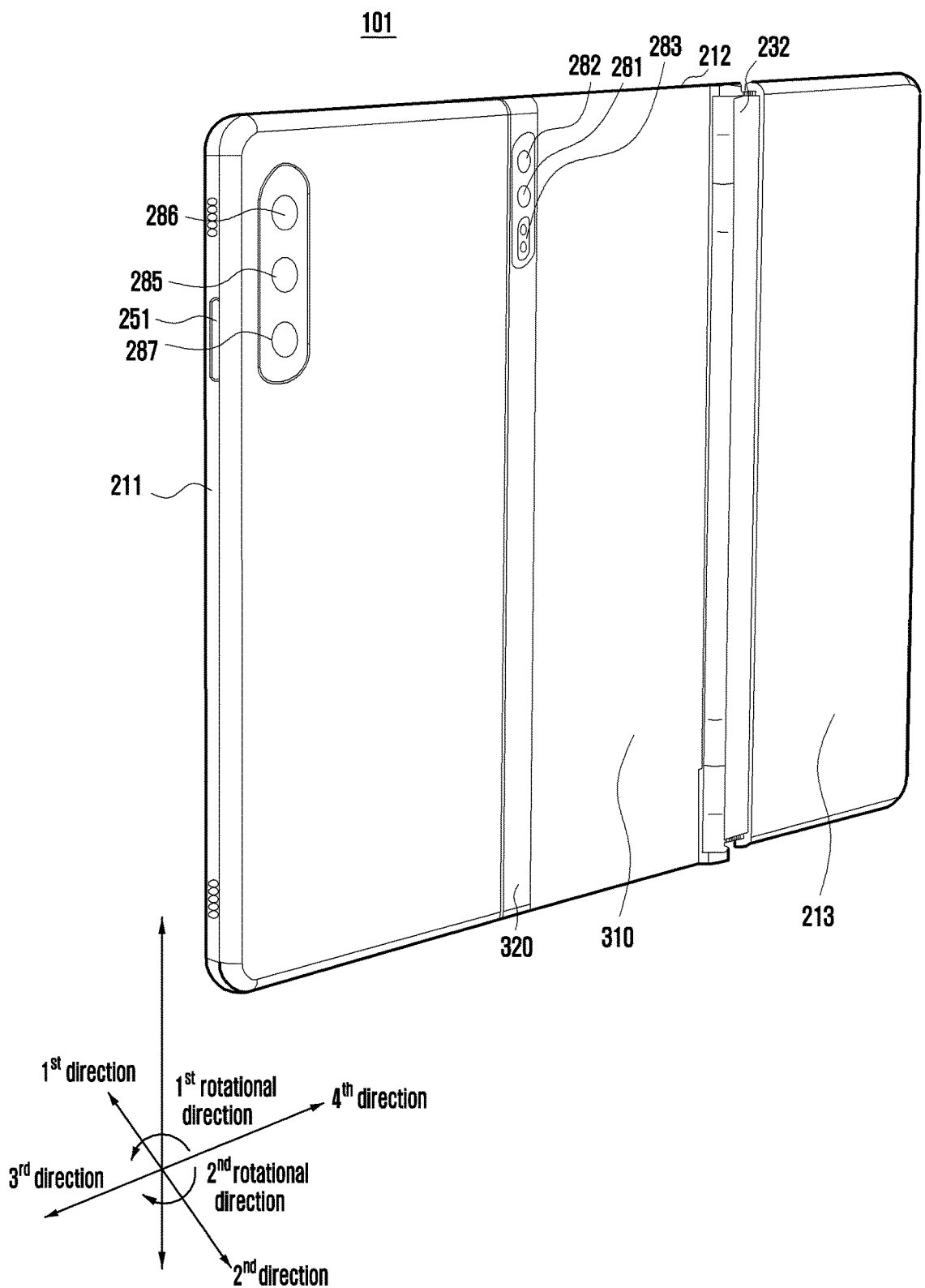
FIG. 2B is a diagram illustrating a rear stereoscopic view of an unfolding state or open state of an electronic device according to an embodiment of the disclosure.

FIG. 2B is a diagram illustrating a rear stereoscopic view of an unfolding state or open state of an electronic device according to an embodiment of the disclosure.

Referring to FIGS. 2A and 2B, according to various embodiments of the disclosure, the electronic device 101 may include a foldable housing 211, 212, and 213, a flexible display 260, at least one camera 281 and 285, at least one sensor 283 and 287, and at least one flash 282 and 286.

According to various embodiments of the disclosure, the foldable housing 211, 212, and 213 may include a first housing 211, a second housing 212, and a third housing 213. In the foldable housing 211, 212, and 213, the first and second housings 211 and 212 may be connected through a first connecting member (the first connecting member 231 in FIG. 3C), and the second and third housings 212 and 213 may be connected through a second connecting member 232. In various embodiments of the disclosure, the flexible display 260 may be identical with the display device 160 in FIG. 1. The at least one camera 281 and 285 may be identical with the camera module 180 in FIG. 1.

According to various embodiments of the disclosure, the electronic device 101 may include a camera 290 facing a first direction in at least a partial region. The electronic device 101 may include the camera 290 facing the first direction in at least a partial region of the first housing 211. The electronic device 101 may include the camera 290 facing the first direction in at least a partial region of the second housing 212. According to various embodiments of the disclosure, the camera 290 facing the first direction of the electronic device 101 may be located in a first display area 261 of the first housing 211. According to various embodiments of the disclosure, the second housing 212 of the electronic device 101 may allow the camera 290 to be disposed in at least a partial region of a second display area 262 of the flexible display 260.

According to various embodiments of the disclosure, the first connecting member 231 may be an in-folding type connecting member, and the second connecting member 232 may be an out-folding type connecting member.

According to various embodiments of the disclosure, the first housing 211 may have a first surface facing a first direction and a second surface facing a second direction, and the first and second surfaces may be substantially quadrangle or rectangular in shape. The first surface of the first housing 211 and the second surface of the first housing 211 are spaced apart from each other by a predetermined interval, and the predetermined interval may be a first length t1.

According to various embodiments of the disclosure, the first housing 211 may include the camera 285, the flash 286, and the sensor 287 on at least a portion of the second surface. The first housing 211 may have a side surface that surrounds a space between the first surface of the first housing 211 and the second surface of the first housing 211.

According to various embodiments of the disclosure, the first housing 211 may include a physical button 251 on the side surface thereof. The first housing 211 may include the physical button 251 on a first side surface thereof and may be connected to the first connecting member 231 on a second side surface thereof opposite to the first side surface. The first side surface of the first housing 211 may face a third direction, and the second side surface of the first housing 211 may face a fourth direction. the first side surface of the first housing 211 may include the physical button 251, and the second side surface of the first housing 211 may be connected to the first connecting member (the first connecting member 231 in FIG. 3C).

According to various embodiments of the disclosure, the electronic device 101 may include the flexible display 260 on the first surface of the first housing 211. The electronic device 101 may configure a display area of the flexible display 260 positioned on the first surface of the first housing 211 as the first display area 261 under the control of the processor 120.

A virtual straight line connecting the first and second directions and a virtual straight line connecting the third and fourth directions may be orthogonal to each other.

According to various embodiments of the disclosure, the second housing 212 may have a third surface facing the first direction and a fourth surface facing the second direction, and the third and fourth surfaces may be substantially quadrangle or rectangular in shape. At least a portion of the fourth surface of the second housing 212 may have a first area 310 in which the third housing 213 is placeable. With reference to FIG. 2B, at least a portion of the fourth surface of the second housing 212 may have a second area 320 in which the camera 281, the flash 282, and the sensor 283 are disposed. The second housing 212 may have a side surface surrounding a space between the third surface of the second housing 212 and the fourth surface of the second housing 212.

According to various embodiments of the disclosure, the second housing 212 may have a third side surface facing the third direction and a fourth side surface facing the fourth direction. In the second housing 212, the third side surface and the first connecting member 231 may be connected to each other, and the fourth side surface and the second connecting member 232 may be connected to each other.

Figure 5A:
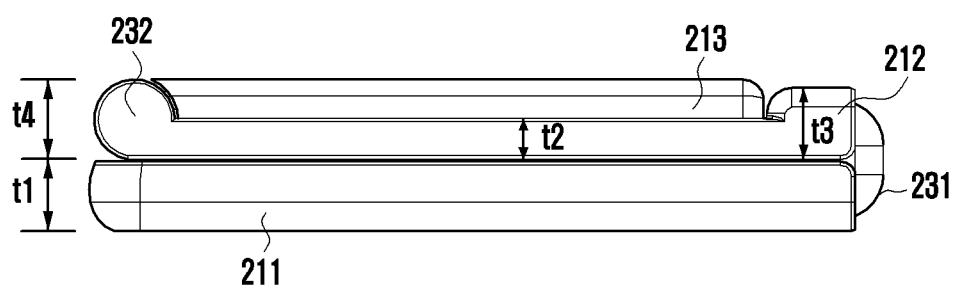
FIG. 5A is a diagram illustrating a side of an electronic device in a folding state or close state of a foldable housing according to an embodiment of the disclosure.

According to various embodiments of the disclosure, in the first area 310 included in the second housing 212, the third surface of the second housing 212 and the fourth surface of the second housing 212 are spaced apart from each other by a predetermined interval, and this predetermined interval may be a second length t2 shown in FIG. 5A.

According to various embodiments of the disclosure, in the second area 320 included in the second housing 212, the third surface of the second housing 212 and the fourth surface of the second housing 212 are spaced apart from each other by a predetermined interval, and this predetermined interval may be a third length t3.

According to various embodiments of the disclosure, the first length t1 may be greater than the second length t2. The third length t3 may be greater than the second length t2. The second connecting member 232 connected to the second housing 212 may have a fourth length t4, and the fourth length t4 may be equal to the first length t1 or the third length t3.

According to various embodiments of the disclosure, the first connecting member 231 may be an in-folding hinge. In the folding state or close state, surfaces of the first and second housings 211 and 212 on which the flexible display 260 is disposed may face each other.

According to various embodiments of the disclosure, the electronic device 101 may include the flexible display 260 on the third surface of the second housing 212. The electronic device 101 may configure a display area of the flexible display 260 positioned on the third surface of the second housing 212 as the second display area 262 under the control of the processor 120.

According to various embodiments of the disclosure, the electronic device 101 may limit an angle between the first housing 211 and the second housing 212 from 0 degrees to 180 degrees. The first connecting member (the first connecting member 231 in FIG. 3C) may move between 0 degrees and 180 degrees. In case that the angle between the first and second housings 211 and 212 is 0 degrees, the surfaces of the first and second housings 211 and 212 on which the flexible display 260 is disposed may face each other. In case that the angle between the first and second housings 211 and 212 is 0 degrees, the first connecting member 231 may allow the first surface of the first housing 211 and the third surface of the second housing 212 to face each other.

According to various embodiments of the disclosure, in case that the angle between the first and second housings 211 and 212 is 180 degrees, the surfaces of the first and second housings 211 and 212 on which the flexible display 260 is disposed may be unfolded flat. In case that the angle between the first and second housings 211 and 212 is 180 degrees, the first connecting member 231 may allow the first surface of the first housing 211 and the third surface of the second housing 212 to be unfolded flat.

According to various embodiments of the disclosure, the first connecting member (the first connecting member 231 in FIG. 3C) may move substantially between 0 degrees and 180 degrees, and it may not be fixed when moving within the above angle. The first connecting member (the first connecting member 231 in FIG. 3C) may be fixed when unfolded substantially by 180 degrees, and its posture may be maintained by a magnet member (not shown) to keep the angle when closed substantially by 0 degrees. The first connecting member (the first connecting member 231 in FIG. 3C) may be fixed when opened substantially by 180 degrees, and when closed substantially by 0 degrees, two surfaces may meet at a certain angle.

According to various embodiments of the disclosure, the first connecting member (the first connecting member 231 in FIG. 3C) may be including a free stop hinge and fixed at any angle substantially between 0 and 180 degrees. The first connecting member (the first connecting member 231 in FIG. 3C) may move the first and second housings 211 and 212 connected to each other to any angle substantially between 0 and 180 degrees. The first connecting member (the first connecting member 231 in FIG. 3C) may fix the first and second housings 211 and 212 connected to each other at any angle substantially between 0 and 180 degrees.

According to various embodiments of the disclosure, the third housing 213 may include a fifth surface facing the first direction and a sixth surface facing the second direction, and the fifth and sixth surfaces may be substantially quadrangle or rectangular in shape. In the folding state or close state, the third housing 213 may be placed in the first area 310 of the second housing 212.

According to various embodiments of the disclosure, the third housing 213 may have a side surface surrounding a space between the fifth surface of the third housing 213 and the sixth surface of the third housing 213. The third housing 213 may have a fifth side surface facing the third direction and a sixth side surface facing the fourth direction. The fifth side surface of the third housing 213 may be connected to the second housing 212 through the second connecting member 232. The second connecting member 232 may connect the second housing 212 and the third housing 213 to each other.

According to various embodiments of the disclosure, the electronic device 101 may include the flexible display 260 on the fifth surface of the third housing 213. The electronic device 101 may configure a display area of the flexible display 260 positioned on the fifth surface of the third housing 212 as the third display area 263 under the control of the processor 120.

According to various embodiments of the disclosure, in the electronic device 101, the flexible display 260 may be positioned on the first surface of the first housing 211, on the third surface of the second housing 212, and on the fifth surface of the third housing 213. The flexible display 260 may be disposed on a surface facing the first direction when the housings 211, 212, and 213 of the electronic device 101 are in the unfolding or open state and may be a display having unity without segmentation.

According to various embodiments of the disclosure, the electronic device 101 may limit an angle between the second housing 212 and the third housing 213 substantially from 0 degrees to 180 degrees. The second connecting member 232 may move substantially between 0 degrees and 180 degrees. In case that the angle between the second and third housings 212 and 213 is substantially 0 degrees, the surfaces of the second and third housings 212 and 213 on which the flexible display 260 is not disposed may face each other. In case that the angle between the second and third housings 212 and 213 is substantially 0 degrees, the second connecting member 232 may allow the fourth surface of the second housing 212 and the sixth surface of the third housing 213 to face each other.

According to various embodiments of the disclosure, in case that the angle between the second and third housings 212 and 213 is substantially 180 degrees, the surfaces of the second and third housings 212 and 213 on which the flexible display 260 is disposed may be unfolded flat. In case that the angle between the second and third housings 212 and 213 is substantially 180 degrees, the second connecting member 232 may allow the third surface of the second housing 212 and the fifth surface of the third housing 213 to be unfolded flat.

According to various embodiments of the disclosure, the second connecting member 232 may move substantially between 0 and 180 degrees, and it may not be fixed when moving within the above angle. The second connecting member 232 may be fixed when unfolded substantially by 180 degrees, and its posture may be maintained by a magnet member (not shown) to keep the angle when closed substantially by 0 degrees. When the second connecting member 232 is closed substantially by 0 degrees, two surfaces may meet at a certain angle.

According to various embodiments of the disclosure, the second connecting member 232 may be including a free stop hinge and fixed at any angle substantially between 0 and 180 degrees. The second connecting member 232 may move the second and third housings 212 and 213 connected to each other to any angle substantially between 0 and 180 degrees. The second connecting member 232 may fix the second and third housings 212 and 213 connected to each other at any angle substantially between 0 and 180 degrees.

According to various embodiments of the disclosure, the first connecting member 231 may be folded toward the second direction and opened toward the first direction. The first and second housings 211 and 212 connected by the first connecting member 231 may be closed or folded when the housing moves to face the second direction, and may be opened or unfolded when the housing moves to face the first direction.

According to various embodiments of the disclosure, the first connecting member 231 may be closed or folded by moving in a first rotational direction, and may be opened or unfolded by moving in a second rotational direction. The first rotational direction may be a counterclockwise direction, and the second rotational direction may be a clockwise direction. For example, the second housing 212 may be in a closed state with the first housing 211 as the first connecting member 231 moves in the first rotational direction, and the second housing 212 may be in an open state with the first housing 211 as the first connecting member 231 moves in the second rotational direction.

According to various embodiments of the disclosure, the second connecting member 232 may be folded toward the first direction and opened toward the second direction. The second and third housings 212 and 213 connected by the second connecting member 232 may be closed or folded when the housing moves to face the first direction, and may be opened or unfolded when the housing moves to face the second direction.

According to various embodiments of the disclosure, the second connecting member 232 may be closed or folded by moving in the second rotational direction, and may be opened or unfolded by moving in the first rotational direction. The first rotational direction may be a counterclockwise direction, and the second rotational direction may be a clockwise direction.

Figure 3A:
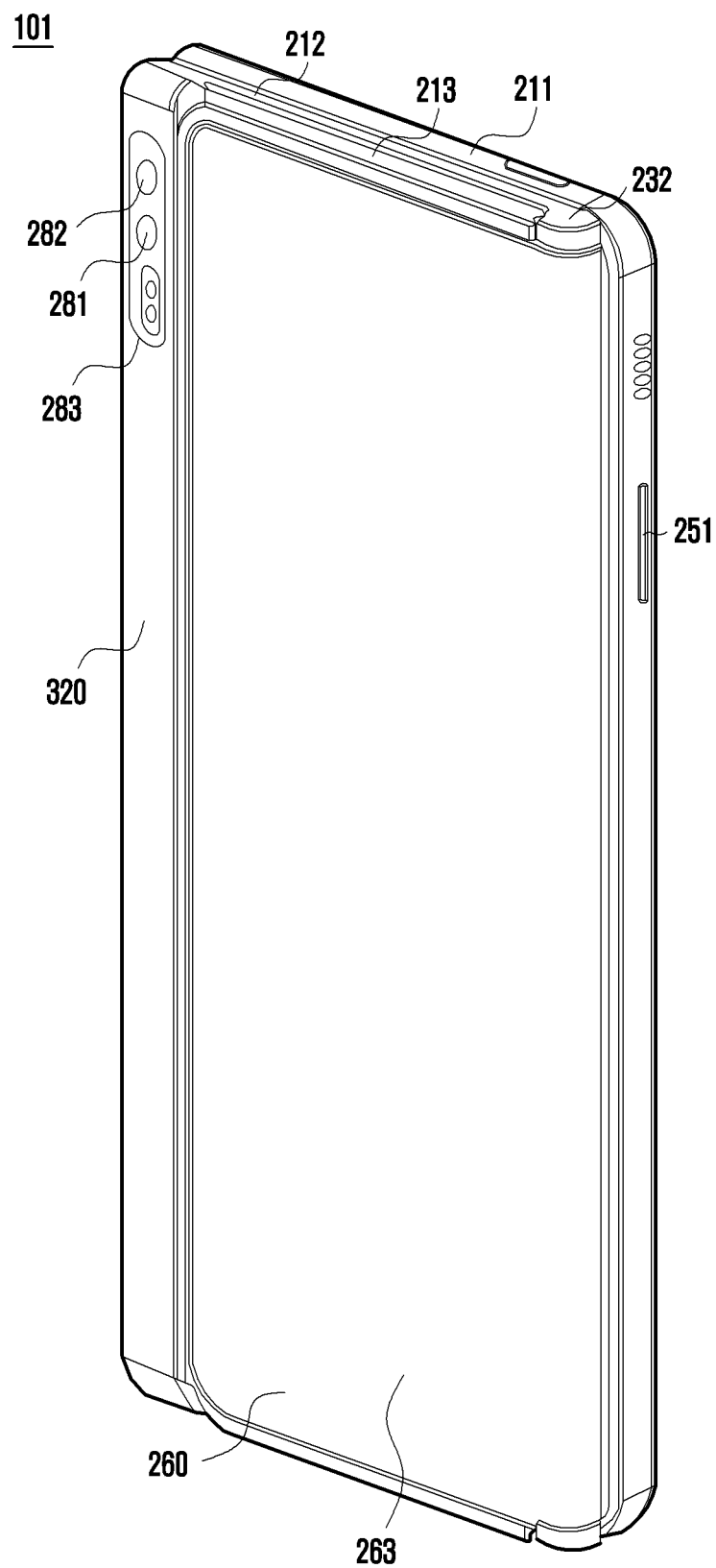
FIG. 3A is a diagram illustrating a front stereoscopic view of a folding state or close state of an electronic device according to an embodiment of the disclosure.
Figure 3B:
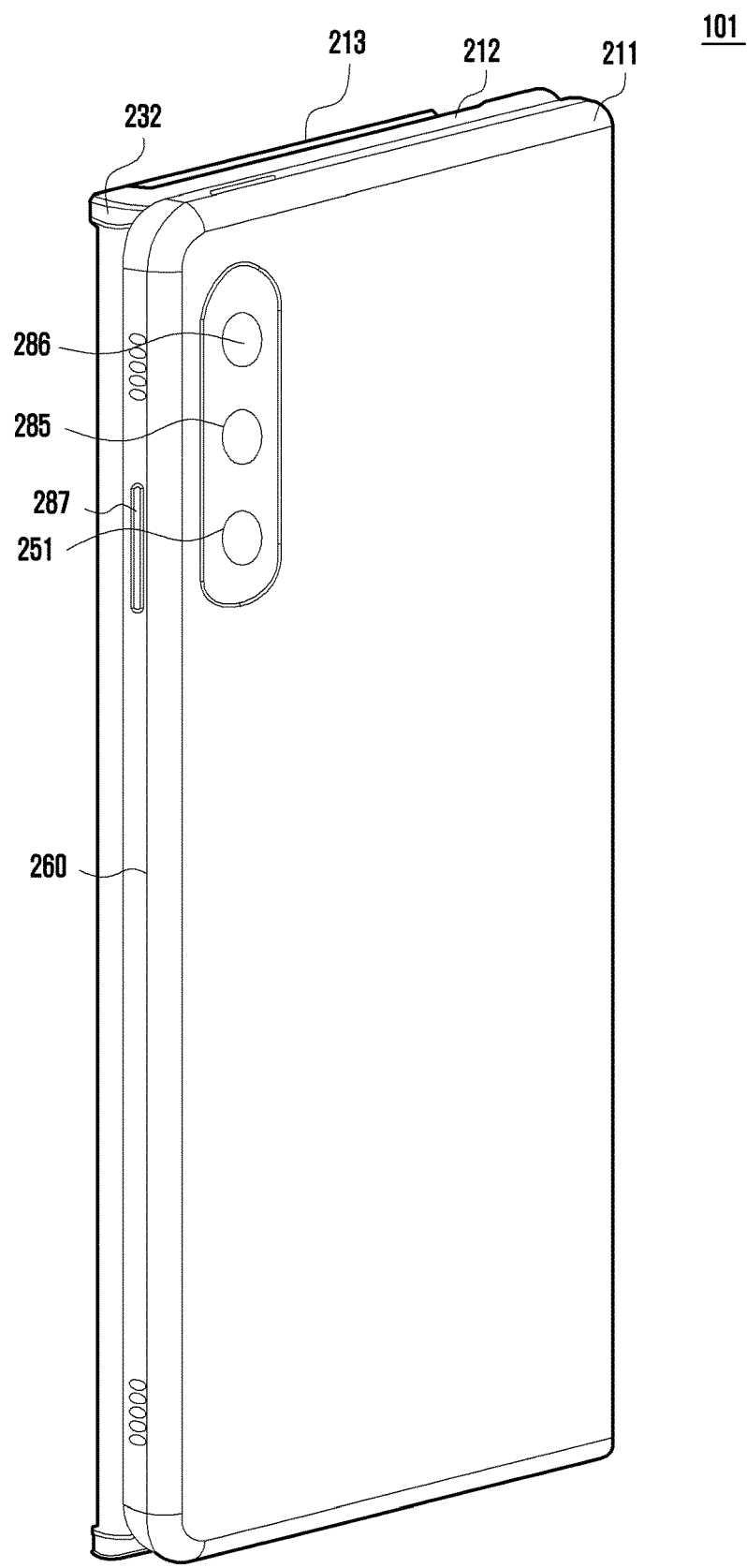
FIG. 3B is a first rear stereoscopic view of a folding state or close state of an electronic device according to an embodiment of the disclosure.
Figure 3C:
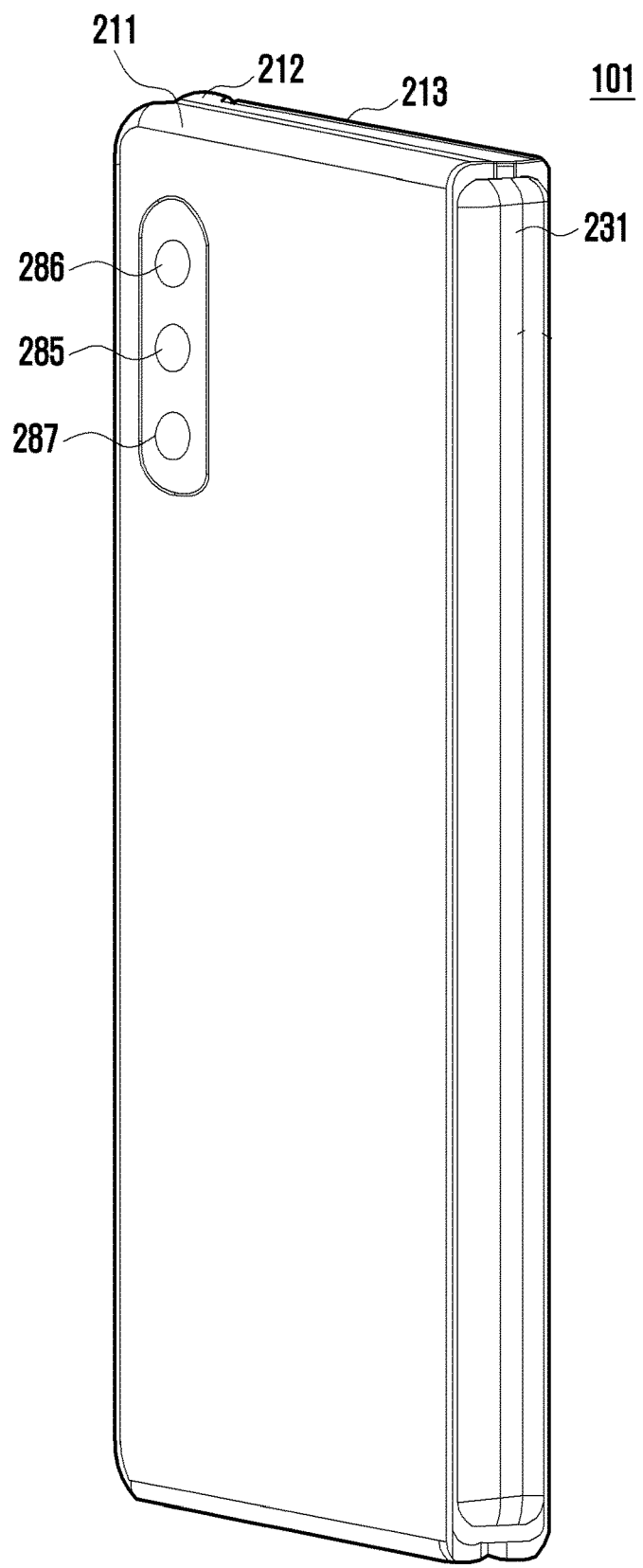
FIG. 3C is a second rear stereoscopic view of a folding state or close state of an electronic device according to an embodiment of the disclosure.

FIG. 3A is a diagram illustrating a front stereoscopic view of a folding state or close state of an electronic device according to an embodiment of the disclosure. FIG. 3B is a first rear stereoscopic view of a folding state or close state of an electronic device according to an embodiment of the disclosure. FIG. 3C is a second rear stereoscopic view of a folding state or close state of an electronic device according to an embodiment of the disclosure.

Referring to FIGS. 3A, 3B, and 3C, according to various embodiments of the disclosure, the electronic device 101 may include the foldable housing 211, 212, and 213, the flexible display 260, the at least one camera 281 and 285, the at least one sensor 283 and 287, and the at least one flash 282 and 286.

According to various embodiments of the disclosure, the foldable housing 211, 212, and 213 may include the first housing 211, the second housing 212, and the third housing 213. In the foldable housing 211, 212, and 213, the first and second housings 211 and 212 may be connected through the first connecting member 231, and the second and third housings 212 and 213 may be connected through the second connecting member 232.

According to various embodiments of the disclosure, the first housing 211 may be substantially quadrangle or rectangular in shape.

According to various embodiments of the disclosure, the first housing 211 may include the camera 285, the flash 286, and the sensor 287 on at least a portion of a surface facing the opposite direction to a surface on which the flexible display 260 is disposed. The first housing 211 may have a side surface that surrounds a space between a surface of the first housing 211 where the flexible display 260 is disposed and a surface of the first housing 211 opposite to the surface where the flexible display 260 is disposed.

According to various embodiments of the disclosure, the first housing 211 may include the physical button 251 on the side surface thereof. The first housing 211 may include the physical button 251 on one side surface thereof and may be connected to the first connecting member 231 on the other side surface thereof opposite to the one side surface.

According to various embodiments of the disclosure, the second housing 212 may be substantially quadrangle or rectangular in shape. At least a portion of the second housing 212 may have the first area (310 in FIG. 2A) in which the third housing 213 is placeable. At least a portion of the second housing 212 may have the second area 320 in which the camera 281, the flash 282, and the sensor 283 are disposed. The second housing 212 may have a side surface that surrounds a space between a surface of the second housing 212 where the flexible display 260 is disposed and a surface of the second housing 212 opposite to the surface where the flexible display 260 is disposed.

According to various embodiments of the disclosure, the second housing 212 may be connected to the first connecting member 231 on one side surface thereof, and connected to the second connecting member 232 on the other side surface thereof opposite to the one side surface.

According to various embodiments of the disclosure, the third housing 213 may be substantially quadrangle or rectangular in shape. In the folding state or close state, the third housing 213 may be placed in the first area (310 in FIG. 2A) of the second housing 212.

According to various embodiments of the disclosure, the third housing 213 may have a side surface that surrounds a space between a surface of the third housing 213 where the flexible display 260 is disposed and a surface of the third housing 213 opposite to the surface where the flexible display 260 is disposed.

One side surface of the third housing 213 may be connected to the second housing 212 through the second connecting member 232. The second connecting member 232 may connect the second housing 212 and the third housing 213.

According to various embodiments of the disclosure, the third housing 213 may include the flexible display 260. The electronic device 101 may configure a display area of the flexible display 260 of the third housing 212 as the third display area 263 under the control of the processor 120.

Figure 4A:
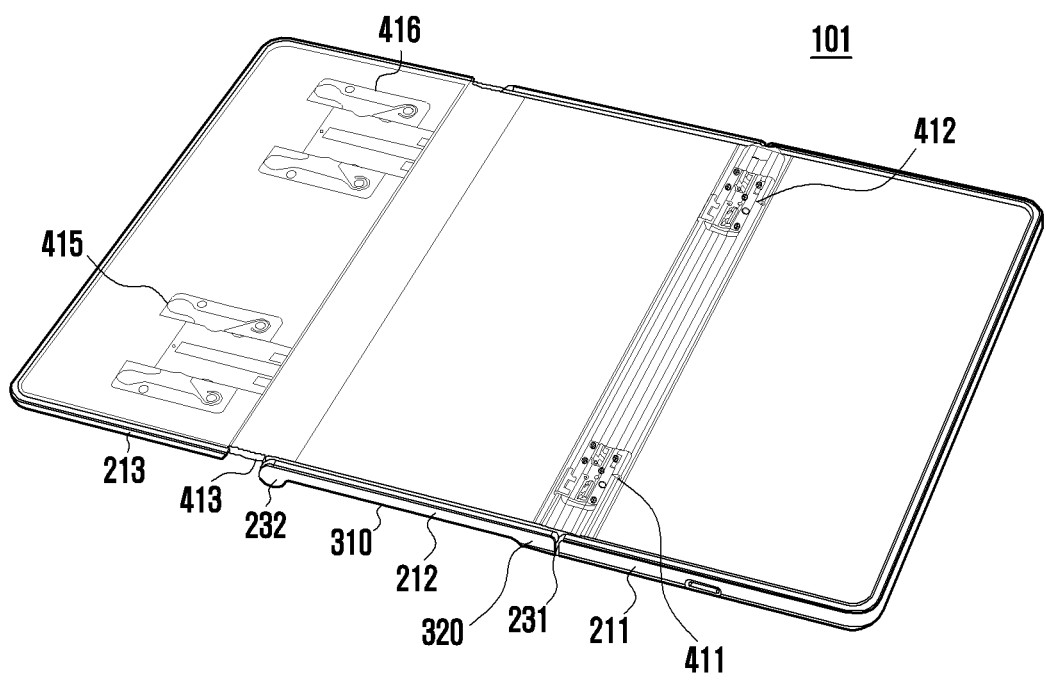
FIG. 4A is a perspective, penetrated view of a foldable housing in an unfolding state or open state of an electronic device according to an embodiment of the disclosure.

FIG. 4A is a perspective, penetrated view of a foldable housing in an unfolding state or open state of an electronic device according to an embodiment of the disclosure.

Referring to FIG. 4A, according to various embodiments of the disclosure, the first connecting member 231 may include at least one or more brackets 411 and 412. The at least one or more brackets 411 and 412 may connect the first housing 211 and the second housing 212 to each other.

According to various embodiments of the disclosure, based on axes of the at least one or more brackets 411 and 412, the first connecting member 231 may form an angle between the first housing 211 and the second housing 212 substantially from 0 degrees to 180 degrees. The at least one or more brackets 411 and 412 may serve to fix a rotation shaft.

According to various embodiments of the disclosure, the at least one or more brackets 411 and 412 may form an angle between the first housing 211 and the second housing 212 substantially from 0 to 180 degrees. The at least one or more brackets 411 and 412 may move substantially between 0 and 180 degrees. In case that the angle between the first housing 211 and the second housing 212 is substantially 0 degrees, surfaces of the first and second housings 211 and 212 on which the flexible display 260 is disposed may face each other.

According to various embodiments of the disclosure, in case that the angle between the first and second housings 211 and 212 is substantially 180 degrees, the at least one or more brackets 411 and 412 may allow the surfaces of the first and second housings 211 and 212, on which the flexible display 260 is disposed, to be unfolded flat. In case that the angle between the first and second housings 211 and 212 is substantially 180 degrees, the at least one or more brackets 411 and 412 may allow the first surface of the first housing 211 and the third surface of the second housing 212 to be unfolded flat.

According to various embodiments of the disclosure, the at least one or more brackets 411 and 412 may move substantially between 0 and 180 degrees, and may not be fixed when moving within the above angle. The at least one or more brackets 411 and 412 may be fixed when unfolded substantially by 180 degrees, and its posture may be maintained by a magnet member (not shown) to keep the angle when closed substantially by 0 degrees.

According to various embodiments of the disclosure, the at least one or more brackets 411 and 412 may be including a free stop hinge and fixed at any angle substantially between 0 and 180 degrees. The at least one or more brackets 411 and 412 may move the first and second housings 211 and 212 connected to each other to any angle substantially between 0 and 180 degrees. The at least one or more brackets 411 and 412 may fix the first and second housings 211 and 212 connected to each other at any angle substantially between 0 and 180 degrees.

According to various embodiments of the disclosure, the second connecting member 232 may include a hinge constitution, and the second housing 212 and the third housing 213 may be positioned at an angle substantially from 0 degrees to 180 degrees, based on a hinge axis between the second and third housings 212 and 213.

According to various embodiments of the disclosure, the second connecting member 232 may include a multi joint structure 413 and/or at least one or more sliding structures 415 and 416.

Using the multi joint structure 413, the second connecting member 232 may connect the second housing 212 and the third housing 213 to each other.

The multi-joint structure 413 may have elasticity as a multi joint structure.

The at least one or more sliding structures 415 and 416 are disposed inside the third housing 213 and may allow the third housing 213 to move away from or closer to the second connecting member 232. The at least one or more sliding structures 415 and 416 may be unfolded when the angle between the second and third housings 212 and 213 is substantially 180 degrees, thereby allowing the third housing 213 to move away from the second connecting member 232. The at least one or more sliding structures 415 and 416 may be closed when the angle between the second and third housings 212 and 213 is substantially 0 degrees, thereby allowing the third housing 213 to move closer to the second connecting member 232.

According to various embodiments of the disclosure, the multi joint structure 413 and/or the at least one or more sliding structures 415 and 416 included in the second connecting member 232 may limit an angle between the second housing 212 and the third housing 213 substantially from 0 degrees to 180 degrees. In case that the angle between the second and third housings 212 and 213 is substantially 0 degrees, the surfaces of the second and third housings 212 and 213 on which the flexible display 260 is not disposed may face each other. In case that the angle between the second and third housings 212 and 213 is substantially 0 degrees, the fourth surface of the second housing 212 and the sixth surface of the third housing 213 may face each other.

According to various embodiments of the disclosure, in case that the angle between the second and third housings 212 and 213 is substantially 180 degrees, the surfaces of the second and third housings 212 and 213 on which the flexible display 260 is disposed may be unfolded flat. In case that the angle between the second and third housings 212 and 213 is substantially 180 degrees, the multi joint structure 413 and/or the at least one or more sliding structures 415 and 416 included in the second connecting member 232 may allow the third surface of the second housing 212 and the fifth surface of the third housing 213 to be unfolded flat.

According to various embodiments of the disclosure, the multi joint structure 413 or the at least one or more sliding structures 415 and 416 included in the second connecting member 232 may perform a free stop operation using a locking part or the like, and may be fixed at any angle substantially between 0 and 180 degrees. The multi joint structure 413 or the at least one or more sliding structures 415 and 416 included in the second connecting member 232 may move the second and third housings 212 and 213 connected to each other to any angle substantially between 0 and 180 degrees. The multi joint structure 413 or the at least one or more sliding structures 415 and 416 included in the second connecting member 232 may fix the second and third housings 212 and 213 connected to each other at any angle substantially between 0 and 180 degrees.

Figure 4B:
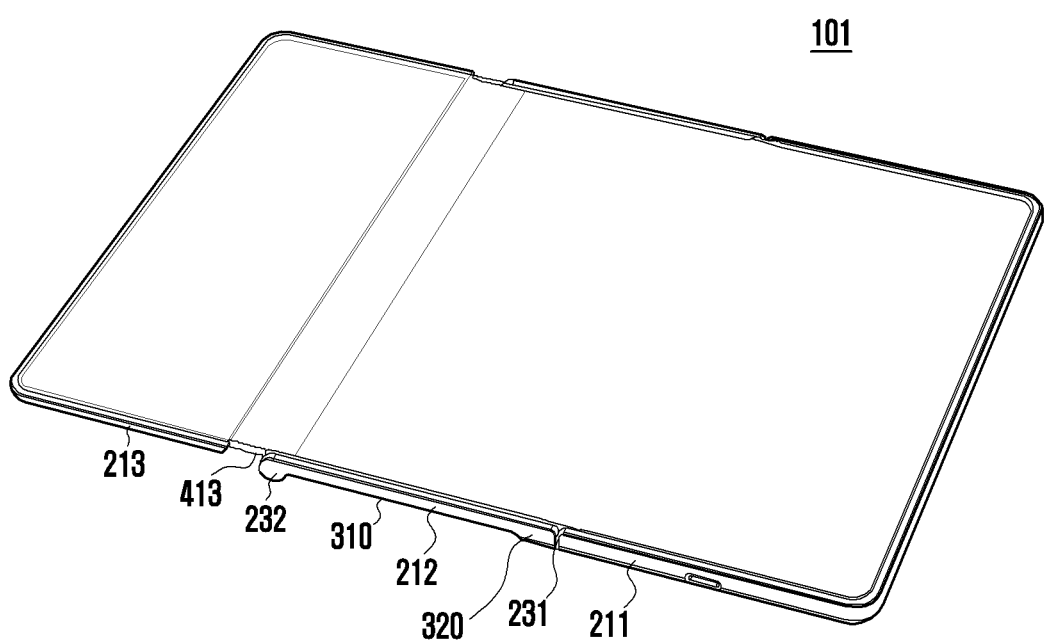
FIG. 4B is a perspective, penetrated view of a foldable housing in an unfolding state or open state of an electronic device according to an embodiment of the disclosure.

FIG. 4B is a perspective, penetrated view of a foldable housing in an unfolding state or open state of an electronic device according to an embodiment of the disclosure.

Referring to FIG. 4B, according to various embodiments of the disclosure, the second connecting member 232 may include a hinge constitution, and the second housing 212 and the third housing 213 may be positioned at an angle substantially from 0 degrees to 180 degrees, based on a hinge axis between the second and third housings 212 and 213.

According to various embodiments of the disclosure, the second connecting member 232 may include the multi joint structure 413.

Using the multi joint structure 413, the second connecting member 232 may connect the second housing 212 and the third housing 213 to each other. The multi-joint structure 413 may have elasticity as a multi joint structure.

According to various embodiments of the disclosure, the multi joint structure 413 included in the second connecting member 232 may limit an angle between the second housing 212 and the third housing 213 substantially from 0 degrees to 180 degrees. In case that the angle between the second and third housings 212 and 213 is substantially 0 degrees, the surfaces of the second and third housings 212 and 213 on which the flexible display 260 is not disposed may face each other. In case that the angle between the second and third housings 212 and 213 is substantially 0 degrees, the fourth surface of the second housing 212 and the sixth surface of the third housing 213 may face each other.

According to various embodiments of the disclosure, in case that the angle between the second and third housings 212 and 213 is substantially 180 degrees, the surfaces of the second and third housings 212 and 213 on which the flexible display 260 is disposed may be unfolded flat. In case that the angle between the second and third housings 212 and 213 is substantially 180 degrees, the multi joint structure 413 included in the second connecting member 232 may allow the third surface of the second housing 212 and the fifth surface of the third housing 213 to be unfolded flat.

According to various embodiments of the disclosure, the multi joint structure 413 included in the second connecting member 232 may perform a free stop operation, and may be fixed at any angle substantially between 0 and 180 degrees. The multi joint structure 413 included in the second connecting member 232 may move the second and third housings 212 and 213 connected to each other to any angle substantially between 0 and 180 degrees. The multi joint structure 413 included in the second connecting member 232 may fix the second and third housings 212 and 213 connected to each other at any angle substantially between 0 and 180 degrees.

Figure 4C:
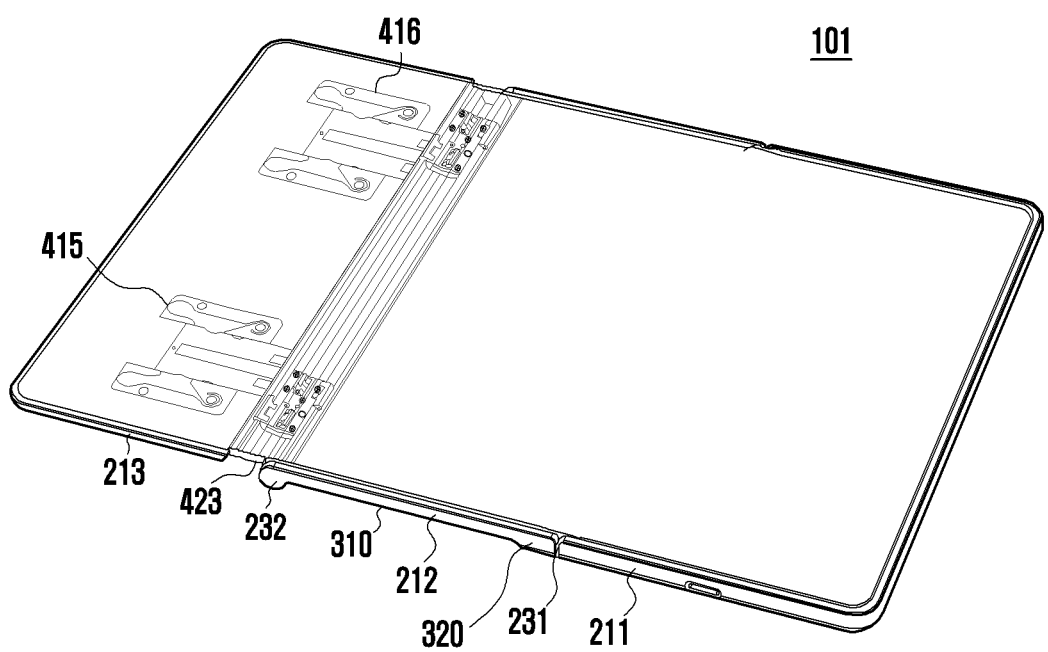
FIG. 4C is a perspective, penetrated view of a foldable housing in an unfolding state or open state of an electronic device according to an embodiment of the disclosure.

FIG. 4C is a perspective, penetrated view of a foldable housing in an unfolding state or open state of an electronic device according to an embodiment of the disclosure.

Referring to FIG. 4C, according to various embodiments of the disclosure, the second connecting member 232 may include a hinge constitution, and the second housing 212 and the third housing 213 may be positioned at an angle substantially from 0 degrees to 180 degrees, based on a hinge axis between the second and third housings 212 and 213.

According to various embodiments of the disclosure, the second connecting member 232 may include a hinge structure 423 and/or at least one or more sliding structures 415 and 416.

Using the hinge structure 423, the second connecting member 232 may connect the second housing 212 and the third housing 213 to each other.

The at least one or more sliding structures 415 and 416 are disposed inside the third housing 213 and may allow the third housing 213 to move away from or closer to the second connecting member 232. The at least one or more sliding structures 415 and 416 may be unfolded when the angle between the second and third housings 212 and 213 is substantially 180 degrees, thereby allowing the third housing 213 to move away from the second connecting member 232. The at least one or more sliding structures 415 and 416 may be closed when the angle between the second and third housings 212 and 213 is substantially 0 degrees, thereby allowing the third housing 213 to move closer to the second connecting member 232.

According to various embodiments of the disclosure, the hinge structure 423 and/or the at least one or more sliding structures 415 and 416 included in the second connecting member 232 may limit an angle between the second housing 212 and the third housing 213 substantially from 0 degrees to 180 degrees. In case that the angle between the second and third housings 212 and 213 is substantially 0 degrees, the surfaces of the second and third housings 212 and 213 on which the flexible display 260 is not disposed may face each other. In case that the angle between the second and third housings 212 and 213 is substantially 0 degrees, the fourth surface of the second housing 212 and the sixth surface of the third housing 213 may face each other.

According to various embodiments of the disclosure, in case that the angle between the second and third housings 212 and 213 is substantially 180 degrees, the surfaces of the second and third housings 212 and 213 on which the flexible display 260 is disposed may be unfolded flat. In case that the angle between the second and third housings 212 and 213 is substantially 180 degrees, the hinge structure 423 and/or the at least one or more sliding structures 415 and 416 included in the second connecting member 232 may allow the third surface of the second housing 212 and the fifth surface of the third housing 213 to be unfolded flat.

According to various embodiments of the disclosure, the hinge structure 423 or the at least one or more sliding structures 415 and 416 included in the second connecting member 232 may perform a free stop operation using a locking part or the like, and may be fixed at any angle substantially between 0 and 180 degrees. The hinge structure 423 or the at least one or more sliding structures 415 and 416 included in the second connecting member 232 may move the second and third housings 212 and 213 connected to each other to any angle substantially between 0 and 180 degrees. The hinge structure 423 or the at least one or more sliding structures 415 and 416 included in the second connecting member 232 may fix the second and third housings 212 and 213 connected to each other at any angle substantially between 0 and 180 degrees.

Figure 4D:
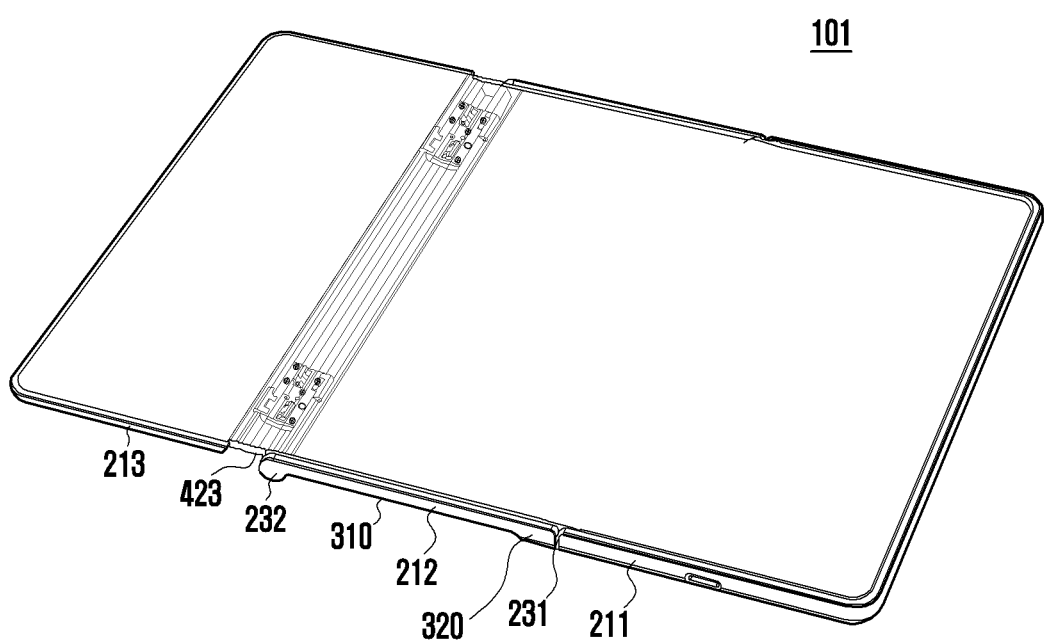
FIG. 4D is a perspective, penetrated view of a foldable housing in an unfolding state or open state of an electronic device according to an embodiment of the disclosure.

FIG. 4D is a perspective, penetrated view of a foldable housing in an unfolding state or open state of an electronic device according to an embodiment of the disclosure.

Referring to FIG. 4D, according to various embodiments of the disclosure, the second connecting member 232 may include a hinge constitution, and the second housing 212 and the third housing 213 may be positioned at an angle substantially from 0 degrees to 180 degrees, based on a hinge axis between the second and third housings 212 and 213.

According to various embodiments of the disclosure, the second connecting member 232 may include the hinge structure 423.

Using the hinge structure 423, the second connecting member 232 may connect the second housing 212 and the third housing 213 to each other.

According to various embodiments of the disclosure, the hinge structure 423 included in the second connecting member 232 may limit an angle between the second housing 212 and the third housing 213 substantially from 0 degrees to 180 degrees. In case that the angle between the second and third housings 212 and 213 is substantially 0 degrees, the surfaces of the second and third housings 212 and 213 on which the flexible display 260 is not disposed may face each other. In case that the angle between the second and third housings 212 and 213 is substantially 0 degrees, the fourth surface of the second housing 212 and the sixth surface of the third housing 213 may face each other.

According to various embodiments of the disclosure, in case that the angle between the second and third housings 212 and 213 is substantially 180 degrees, the surfaces of the second and third housings 212 and 213 on which the flexible display 260 is disposed may be unfolded flat.

According to various embodiments of the disclosure, the hinge structure 423 included in the second connecting member 232 may perform a free stop operation, and may be fixed at any angle substantially between 0 and 180 degrees. The hinge structure 423 included in the second connecting member 232 may fix the second and third housings 212 and 213 connected to each other at any angle substantially between 0 and 180 degrees.

FIG. 5A is a diagram illustrating a side of an electronic device in a folding state or close state of a foldable housing according to an embodiment of the disclosure.

Referring to FIG. 5A, according to various embodiments of the disclosure, the first housing 211 may have the first surface facing the first direction and the second surface facing the second direction, and the first and second surfaces may be substantially quadrangle or rectangular in shape. The first surface of the first housing 211 and the second surface of the first housing 211 are spaced apart from each other by a predetermined interval, and the predetermined interval may be a first length t1.

According to various embodiments of the disclosure, in the first area 310 included in the second housing 212, the third surface of the second housing 212 and the fourth surface of the second housing 212 are spaced apart from each other by a predetermined interval, and this predetermined interval may be a second length t2.

According to various embodiments of the disclosure, in the second area 320 included in the second housing 212, the third surface of the second housing 212 and the fourth surface of the second housing 212 are spaced apart from each other by a predetermined interval, and this predetermined interval may be a third length t3.

According to various embodiments of the disclosure, the first length t1 may be greater than the second length t2. The third length t3 may be greater than the second length t2.

According to various embodiments of the disclosure, the second connecting member 232 may have a substantially cylindrical or tubular shape. The second connecting member 232 may have a bottom having a length t4 substantially equal to the first length t1.

Figure 5B:
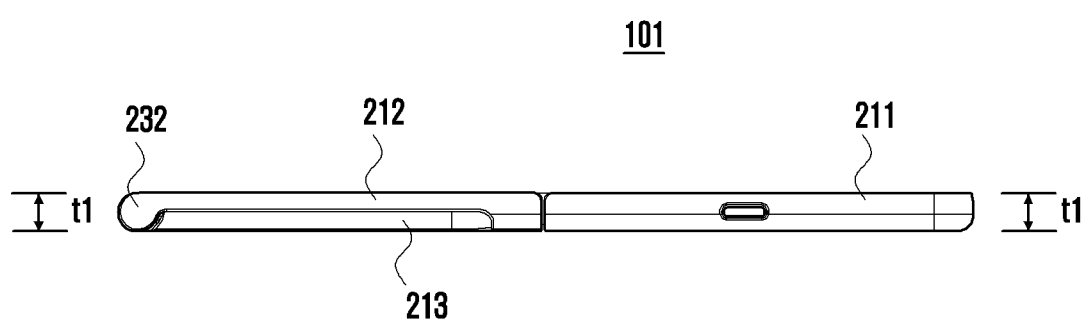
FIG. 5B is a diagram illustrating a side of an electronic device in a folding state or close state of second and third housings and in an unfolding state or open state of first and second housings according to an embodiment of the disclosure.

FIG. 5B is a diagram illustrating a side of an electronic device in a folding state or close state of second and third housings and in an unfolding state or open state of first and second housings according to an embodiment of the disclosure.

Referring to FIG. 5B, according to various embodiments of the disclosure, in the folding or close state, the thickness of the second and third housings 212 and 213 of the electronic device 101 may be substantially equal to the first length t1. This thickness may refer to a distance and/or a length between both surfaces of the housing 211, 212, and 213.

Figure 5C:
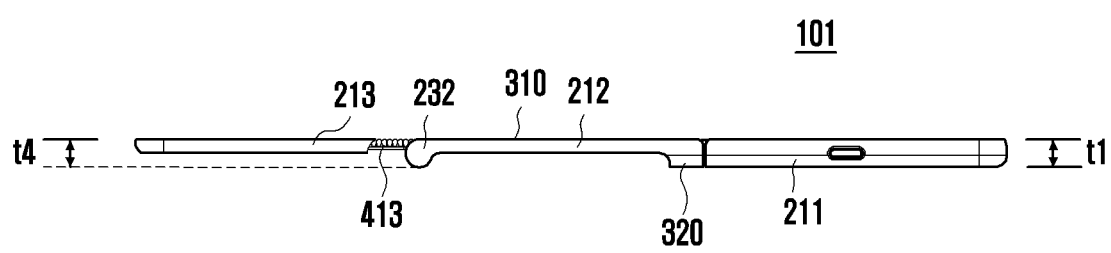
FIG. 5C is a diagram illustrating a side of an electronic device in an unfolding state or open state of first, second, and third housings according to an embodiment of the disclosure.

FIG. 5C is a diagram illustrating a side of an electronic device in an unfolding state or open state of first, second, and third housings according to an embodiment of the disclosure.

Referring to FIG. 5C, according to various embodiments of the disclosure, when the first housing 211, the second housing 212, and the third housing 213 are in the unfolding or open state, the second connecting member 232 may have a bottom having a length t4 substantially equal to the first length t1. The electronic device 101 may include a rear support member (not shown) of the third housing 213 such that the second connecting member 232 has the bottom having the length t4 substantially equal to the first length t1 when the third housing 213 is in the unfolding or open state.

According to various embodiments of the disclosure, even if at least a partial region of the second housing 212 and/or the third housing 213 has a thickness smaller than the first length t1, the first housing 211 and the second connecting member 232 having the fourth length t4 substantially equal to the first length t1 may prevent the electronic device 101 placed on the floor from being inclined or lifted.

According to various embodiments of the disclosure, when the second housing 212 and the third housing 213 are in the folding state or close state, the multi-joint structure 413 included in the second connecting member 232 is contained at least in part inside the third housing 213. However, when the second housing 212 and the third housing 213 are in the unfolding state or open state, the multi joint structure 413 escapes from the third housing 213 and, under the flexible display 260 included in one surfaces of the second and third housings 212 and 213, may provide tension to or support the flexible display 260.

According to various embodiments of the disclosure, the sensor module 176 included in the electronic device 101 is capable of detecting the closing and opening operations of the first housing 211, the second housing 212, or the third housing 213 caused by the movement of the first connecting member 231 or the second connecting member 232. The sensor module 176 capable of detecting the closing and opening operations caused by the movement of the first connecting member 231 or the second connecting member 232 may be, for example, one of a gesture sensor, a magnetic sensor, an acceleration sensor, and a gyro sensor.

Figure 6:
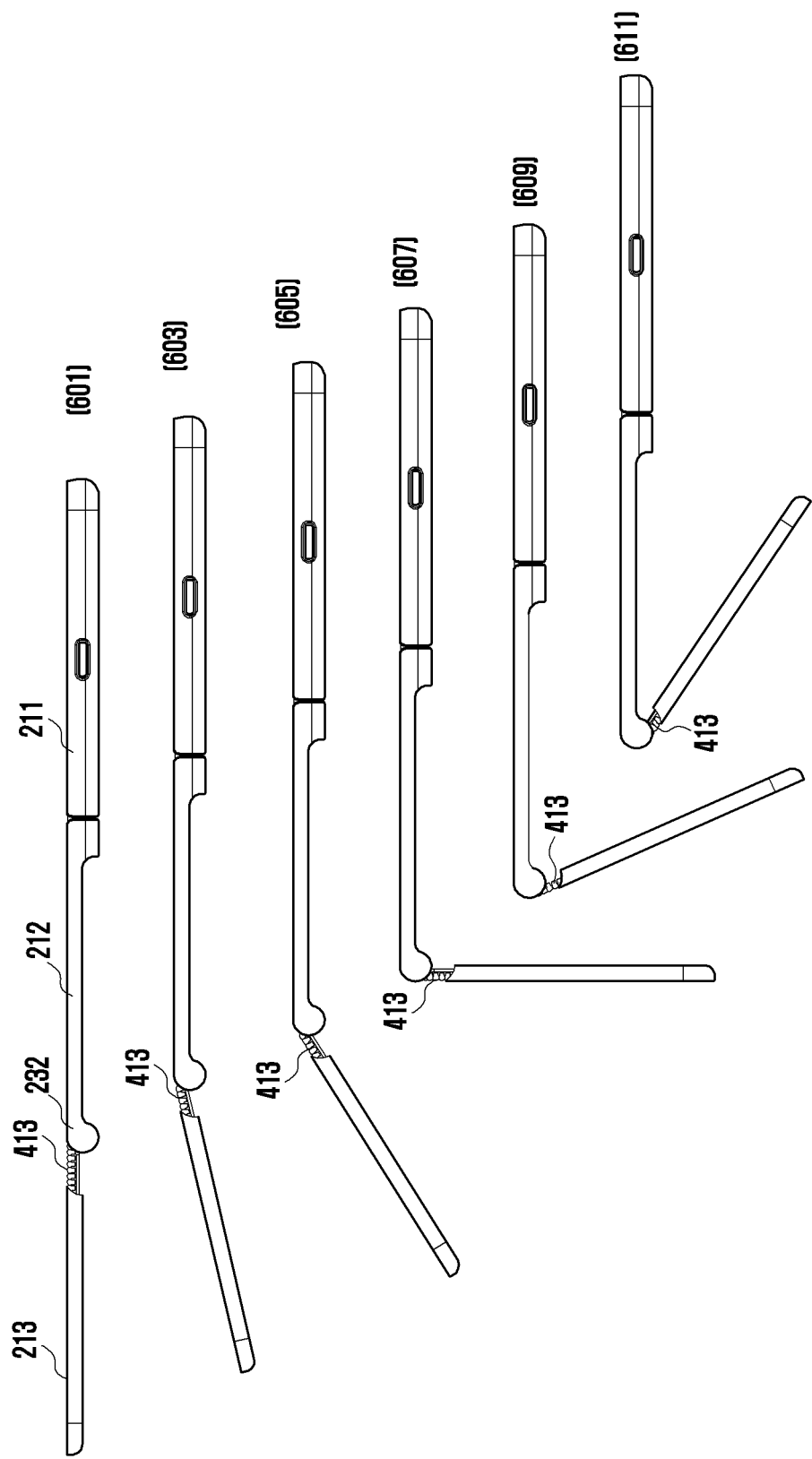
FIG. 6 is a diagram schematically illustrating a case of switching from an unfolding state or open state of first, second, and third housings to a folding state or close state of second and third housings in an electronic device according to an embodiment of the disclosure.

FIG. 6 is a diagram schematically illustrating a case of switching from an unfolding state or open state of first, second, and third housings to a folding state or close state of second and third housings in an electronic device according to an embodiment of the disclosure.

Referring to FIG. 6, with reference to 601, when the second housing 212 and the third housing 213 are in the unfolding state or open state, the third housing 213 moves away from the second connecting member 232 by the sliding structures 415 and 416 and may provide tension to or support the flexible display 260.

With reference to 603, 605, 607, 609, and 611, when the second housing 212 and the third housing 213 are switched to the folding state or close state, the third housing 213 may come closer to the second connecting member 232 by the sliding structures 415 and 416.

Figure 7:
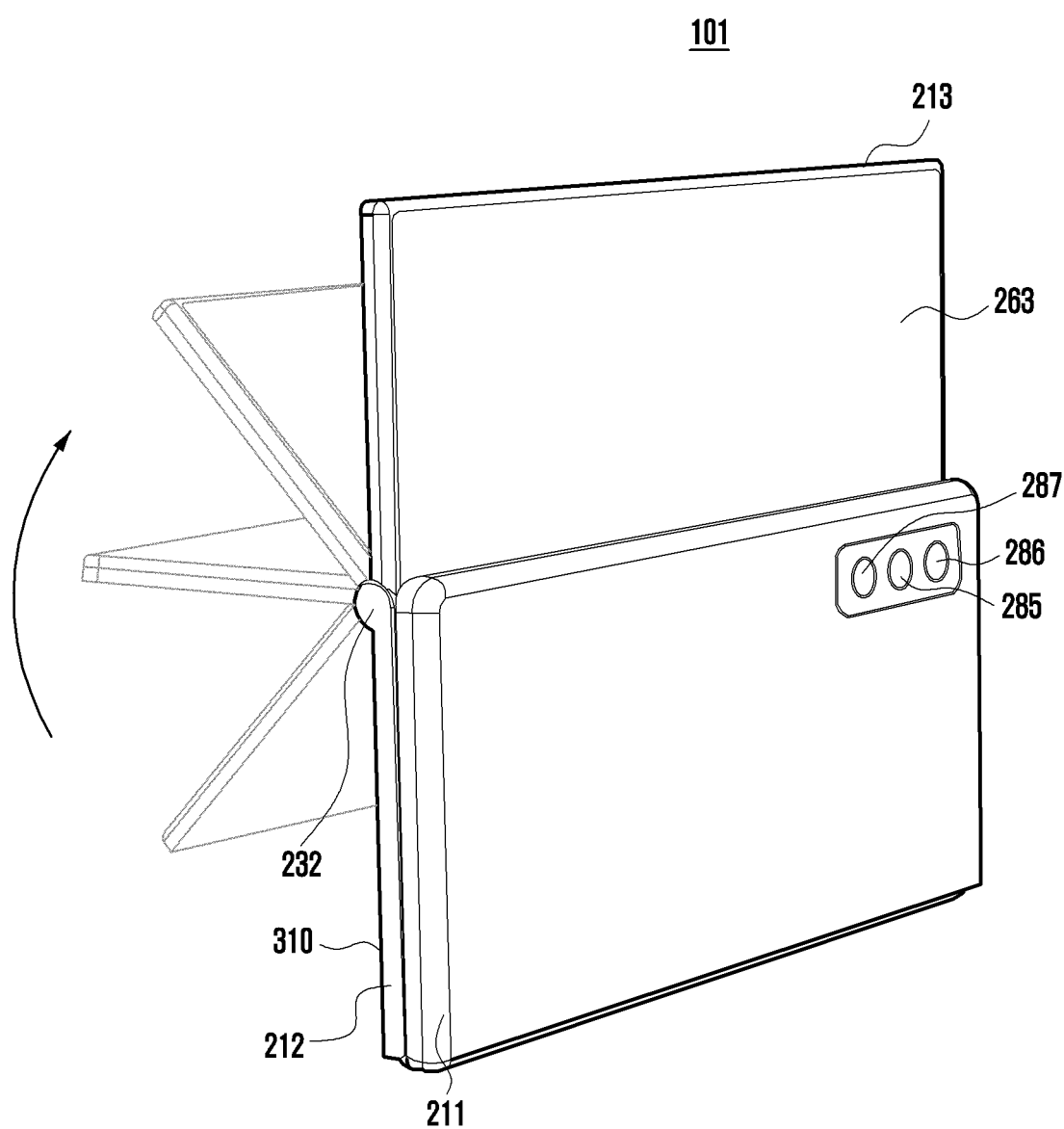
FIG. 7 is a diagram illustrating a camera photographing operation in an unfolding operation of a foldable housing of an electronic device according to an embodiment of the disclosure.

FIG. 7 is a diagram illustrating a camera photographing operation in an unfolding operation of a foldable housing of an electronic device according to an embodiment of the disclosure.

Referring to FIG. 7, according to various embodiments of the disclosure, in a state where the foldable housing of the electronic device 101 is folded or closed, the second housing 212 and/or the third housing 213 may be switched to the unfolding state or open state. When the second and third housings 212 and 213 are switched to the open state by rotation to a substantially 180 degree angle therebetween, and when the third display area 263 of the flexible display 260 of the third housing 213 faces the user of the electronic device 101, the electronic device 101 may recognize a selfie shooting operation through the sensor 287 included therein and activate the camera 285 included in the first housing.

According to various embodiments of the disclosure, the sensor module 176 included in the electronic device 101 is capable of detecting the closing and opening operations of the first housing 211, the second housing 212, and/or the third housing 213 caused by the movement of the first connecting member 231 or the second connecting member 232. The sensor module 176 capable of detecting the closing and opening operations caused by the movement of the first connecting member 231 or the second connecting member 232 may be, for example, one of a gesture sensor, a magnetic sensor, an acceleration sensor, and a gyro sensor.

Figure 8:
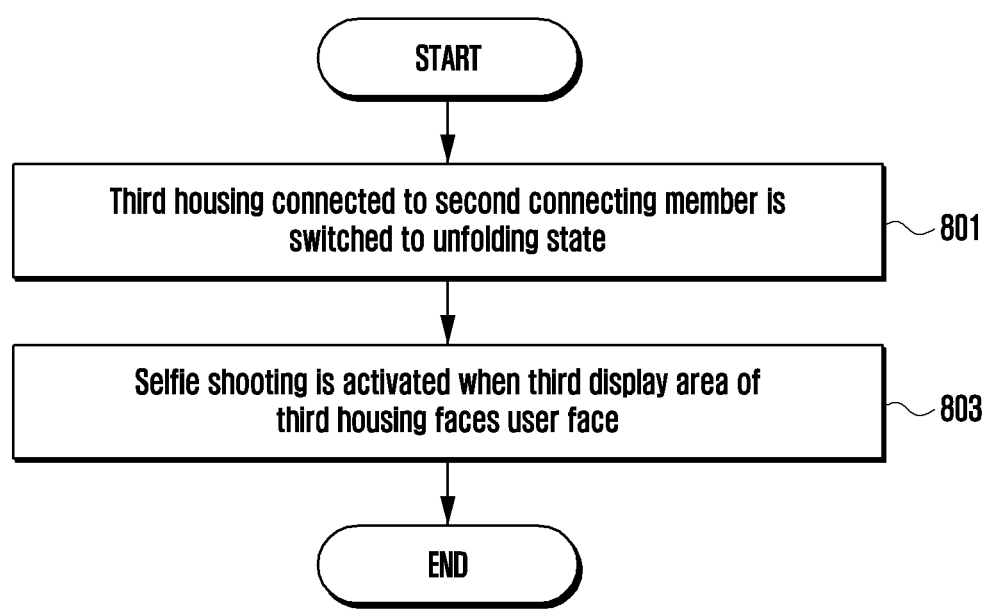
FIG. 8 is a flow chart illustrating a camera photographing operation in an unfolding operation of a foldable housing of an electronic device according to an embodiment of the disclosure.

FIG. 8 is a flow chart illustrating a camera photographing operation in an unfolding operation of a foldable housing of an electronic device according to an embodiment of the disclosure.

Referring to FIG. 8, according to various embodiments of the disclosure, at operation 801, under the control of the processor 120, the electronic device 101 may determine whether the second and third housings 212 and 213 connected through the second connecting member 232 are switched to the unfolding or open state in the folding or close state of the foldable housing. For example, it may be determined whether the second and third housings 212 and 213 are switched to the open state by rotation to a substantially 180 degree angle therebetween.

According to various embodiments of the disclosure, at operation 803, under the control of the processor 120, when the second and third housings 212 and 213 connected through the second connecting member 232 are switched to the unfolding or open state, and when the third display area 263 of the flexible display 260 included in the third housing 213 faces the user, the electronic device 101 may recognize it as a selfie shooting operation and activate the camera 285 included in the first housing.

FIGS. 9A, 9B, 9C, and 9D are diagrams illustrating a content display operation of an electronic device according to various embodiments of the disclosure.

Figure 9A:
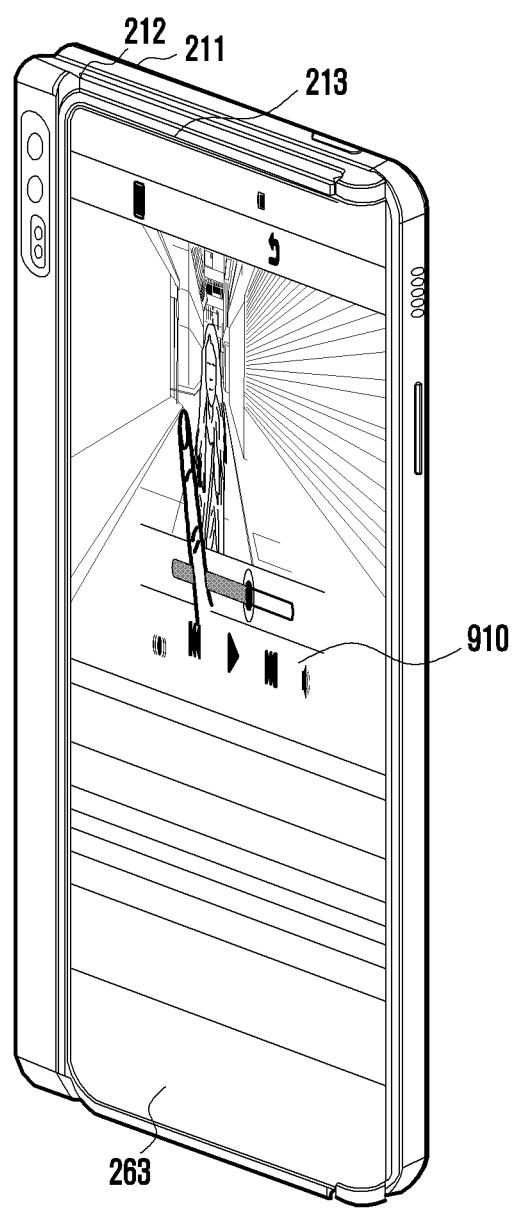
FIGS. 9A, 9B, 9C, and 9D are diagrams illustrating a content display operation of an electronic device according to various embodiments of the disclosure.

Referring to FIG. 9A, according to various embodiments of the disclosure, when the foldable housing of the electronic device 101 is in the folding state or close state, the electronic device 101 may display content 910 through the third display area 263 of the flexible display 260 under the control of the processor 120.

Figure 9B:
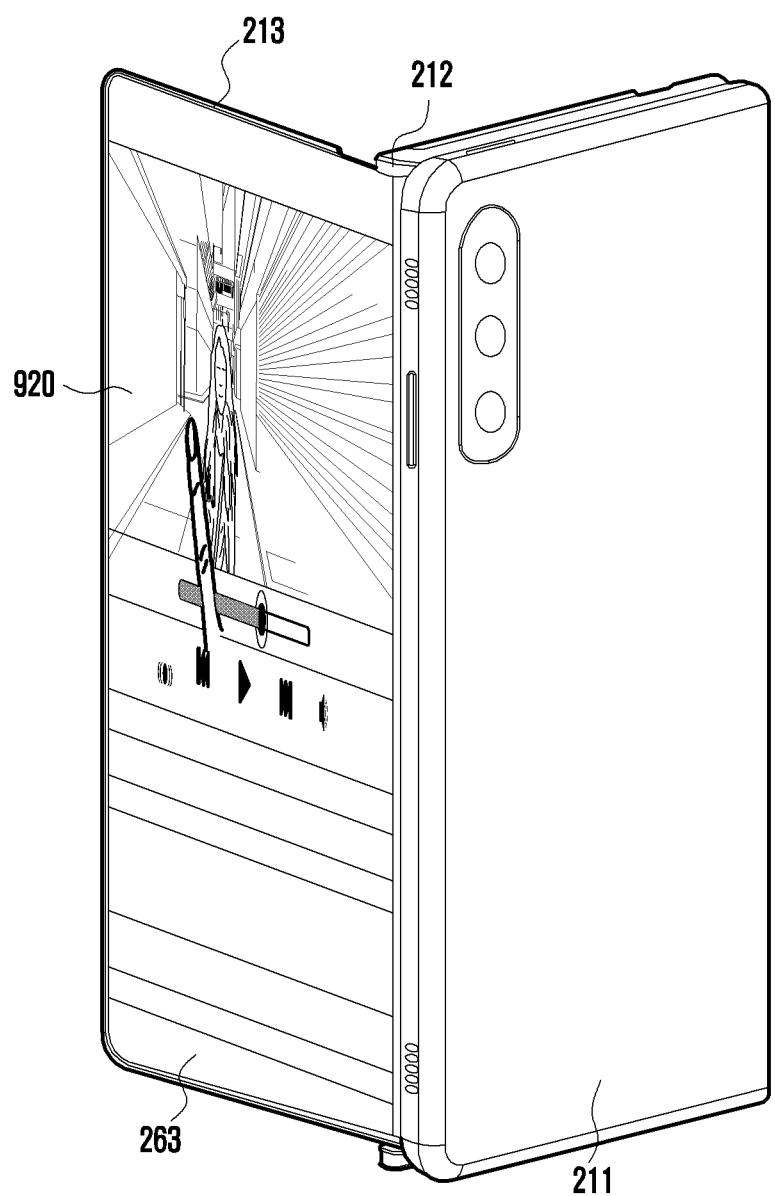

Referring to FIG. 9B, according to various embodiments of the disclosure, when the foldable housing of the electronic device 101 is in the folding state or close state, the third housing 213 may be switched to the unfolding state.

Figure 9C:
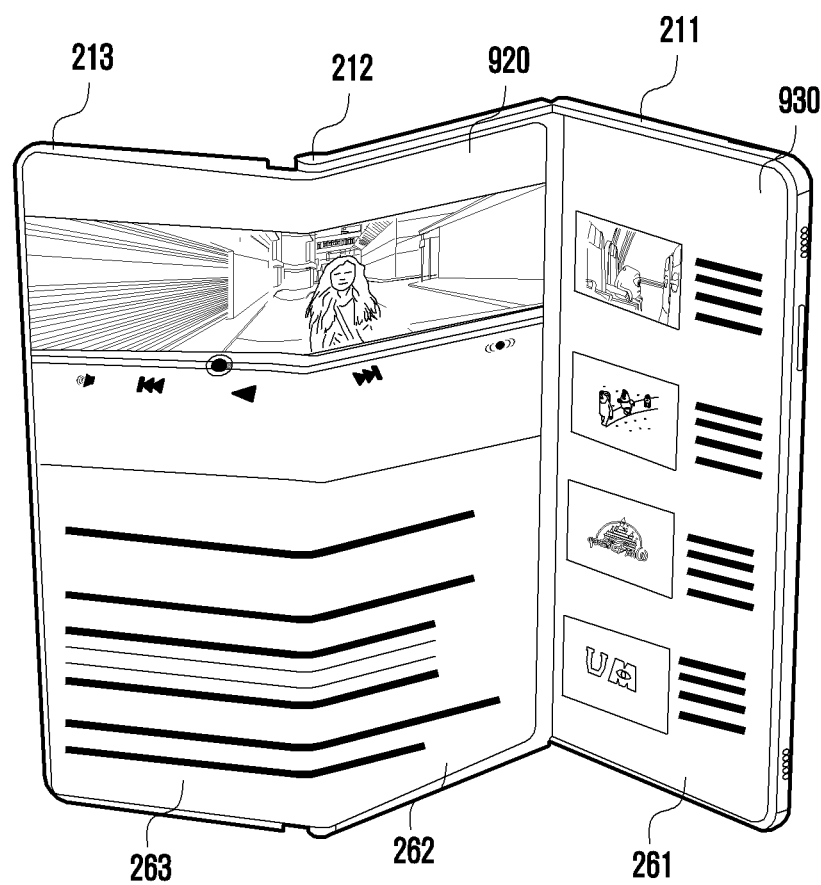
Figure 9D:
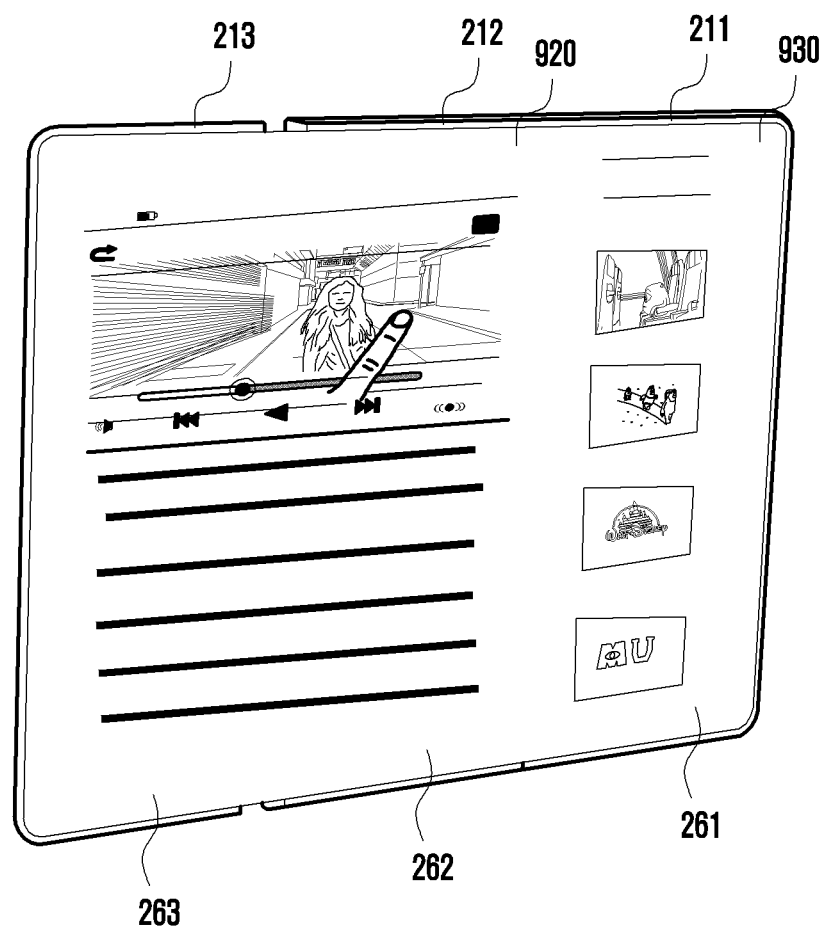

Referring to FIGS. 9C and 9D, when the second housing 212 and the third housing 213 are switched to the unfolding state, and the second housing 212 and the first housing 211 are switched to the unfolding state, enlarged content 920 displayed through the third display area 263 may also be displayed on the second display area 262 of the second housing 212. While the enlarged content 920 is displayed on the second display area 262 and the third display area 263, additional content 930 may be displayed on the first display area 261. The enlarged content 920 and the additional content 930 may be related contents and may be contents in which information is substantially continuous.

Although the contents display operation is described in the order of unfolding the foldable housing from the third housing 213 to the first housing 211 in FIGS. 9A to 9D, the first housing 211 and/or the second housing 212 may be unfolded first, and the third housing 213 may be unfolded later.

According to various embodiments of the disclosure, when the first housing 211 and/or the second housing 212 is unfolded first and the third housing 213 is unfolded later, the contents display operation is as follows. When the first housing 211 and/or the second housing 212 are unfolded, the content 910 being displayed in the third display area 263 of the third housing 213 may be displayed in the first display area 262 and/or the second display area 262 of the first housing 211 and/or the second housing 212, and the related content 920 may be displayed in the third display area 263.

According to various embodiments of the disclosure, when the third housing 213 is unfolded while the first housing 211 and/or the second housing 212 are unfolded, the enlarged content 920 may be displayed in the first display area 261 and the second display area 262, and the additional content 930 may be displayed in the third display area 263.

According to various embodiments of the disclosure, when the third housing 213 is unfolded while the first housing 211 and/or the second housing 212 are unfolded, the enlarged content 920 may be displayed in the second display area 262 and the third display area 263, and the additional content 930 may be displayed in the first display area 261.

Although the contents display operation is described in the order in which the foldable housing is switched from the folding state to the unfolding state in FIGS. 9A to 9D, the contents may be displayed in the reverse order when the foldable housing is switched from the unfolding state to the folding state.

With reference to FIGS. 9C and 9D, when the first housing 211, the second housing 212, and/or the third housing 213 are in the unfolding state, the enlarged content 920 may be displayed in the second display area 262 and the third display area 263, and the additional content 930 may be displayed in the first display area 261.

With reference to FIG. 9B, when the first housing 211 and the second housing 212 are switched to the folding state and the second housing 212 and/or the third housing 213 are in the unfolding state, at least a portion of the enlarged content 920 may be displayed through the third display area 263.

With reference to FIG. 9A, when the first housing 211, the second housing 212, and/or the third housing 213 are switched to the folding state, the enlarged content 920 may be reduced to the content 910, which may be displayed in the third display area 263.

Figure 10A:
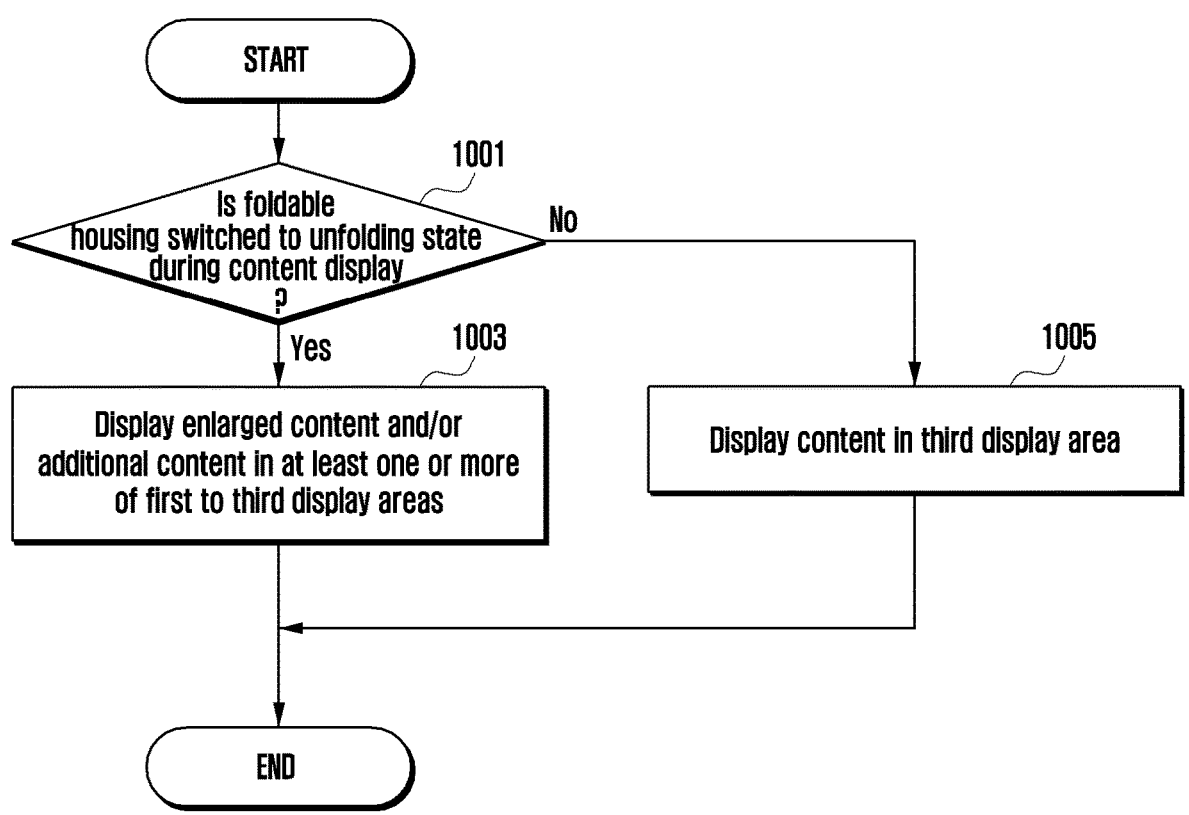
FIG. 10A is a flow chart illustrating a content display operation in an unfolding operation of a foldable housing of an electronic device according to an embodiment of the disclosure.

FIG. 10A is a flow chart illustrating a content display operation in an unfolding operation of a foldable housing of an electronic device according to an embodiment of the disclosure.

Referring to FIG. 10A, according to various embodiments of the disclosure, at operation 1001, under the control of the processor 120, the electronic device 101 may determine whether the foldable housing 211, 212, and 213 is switched to the unfolding state while displaying content in the folding state.

According to various embodiments of the disclosure, if the electronic device 101 determines at the operation 1001 that the foldable housing is switched to the unfolding state, it may perform operation 1003 under the control of the processor 120.

According to various embodiments of the disclosure, upon determination of the unfolding state, at the operation 1003, under the control of the processor 120, the electronic device 101 may display enlarged content and/or additional content in at least one or more of the first to third display areas 261, 262, and 263.

According to various embodiments of the disclosure, when displaying the enlarged content and/or the additional content in at least one or more of the first to third display areas 261, 262, and 263 at the operation 1003, the electronic device 101 may display an increased or enlarged amount of content display as a visual effect.

According to various embodiments of the disclosure, if the electronic device 101 determines at the operation 1001 that the foldable housing maintains the folding state, it may perform operation 1005 under the control of the processor 120.

According to various embodiments of the disclosure, upon determination of the folding state, at the operation 1005, under the control of the processor 120, the electronic device 101 may control displaying content in the third display area 263.

Figure 10B:
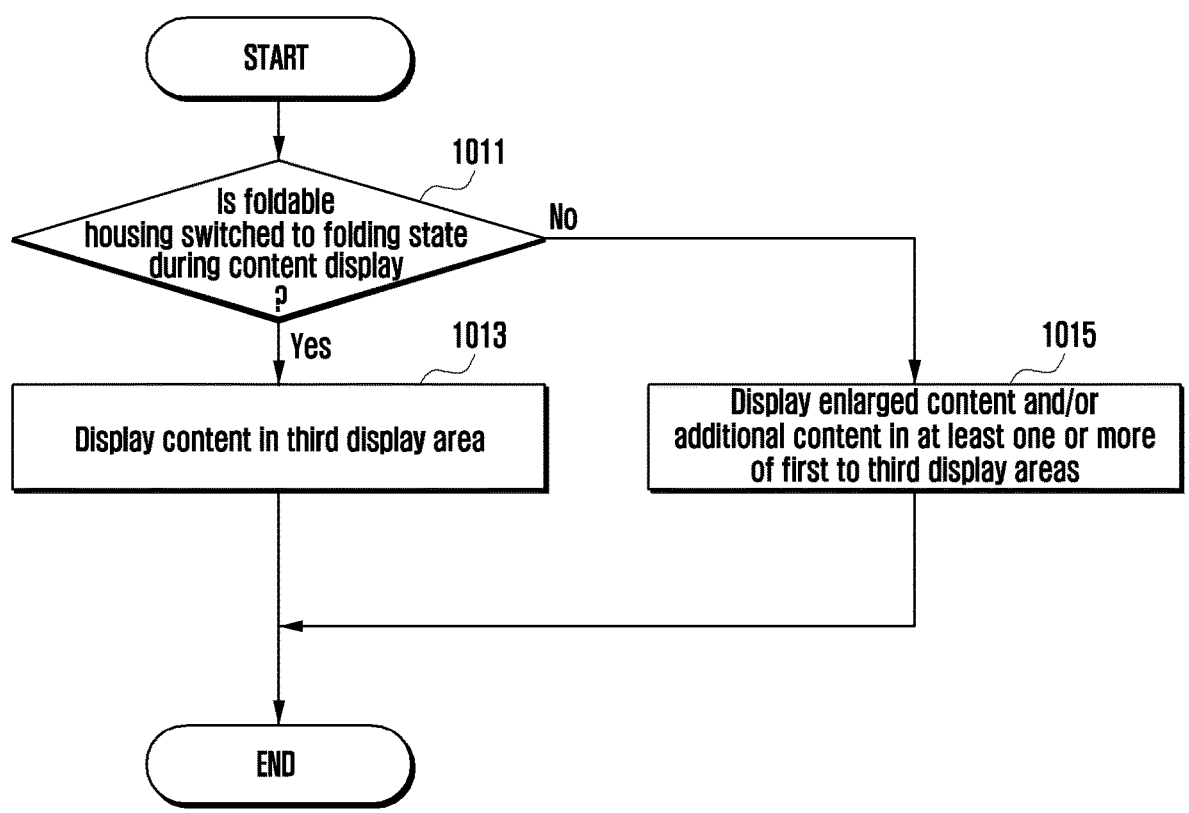
FIG. 10B is a flow chart illustrating a content display operation in a folding operation of a foldable housing of an electronic device according to an embodiment of the disclosure.

FIG. 10B is a flow chart illustrating a content display operation in a folding operation of a foldable housing of an electronic device according to an embodiment of the disclosure.

Referring to FIG. 10B, according to various embodiments of the disclosure, at operation 1011, under the control of the processor 120, the electronic device 101 may determine whether the foldable housing 211, 212, and 213 is switched to the folding state while displaying content in the unfolding state.

According to various embodiments of the disclosure, if the electronic device 101 determines at the operation 1011 that the foldable housing is switched to the folding state, it may perform operation 1013 under the control of the processor 120.

According to various embodiments of the disclosure, upon determination of the folding state, at the operation 1013, under the control of the processor 120, the electronic device 101 may display content in the third display area 263.

According to various embodiments of the disclosure, when displaying the content in the third display area 263 at the operation 1013, the electronic device 101 may display a decreased or reduced amount of content display as a visual effect.

According to various embodiments of the disclosure, if the electronic device 101 determines at the operation 1011 that the foldable housing maintains the unfolding state, it may perform operation 1015 under the control of the processor 120.

According to various embodiments of the disclosure, upon determination of the unfolding state, at the operation 1015, under the control of the processor 120, the electronic device 101 may display an enlarged content and/or additional content in at least one or more of the first to third display areas 261, 262, and 263.

Figure 10C:
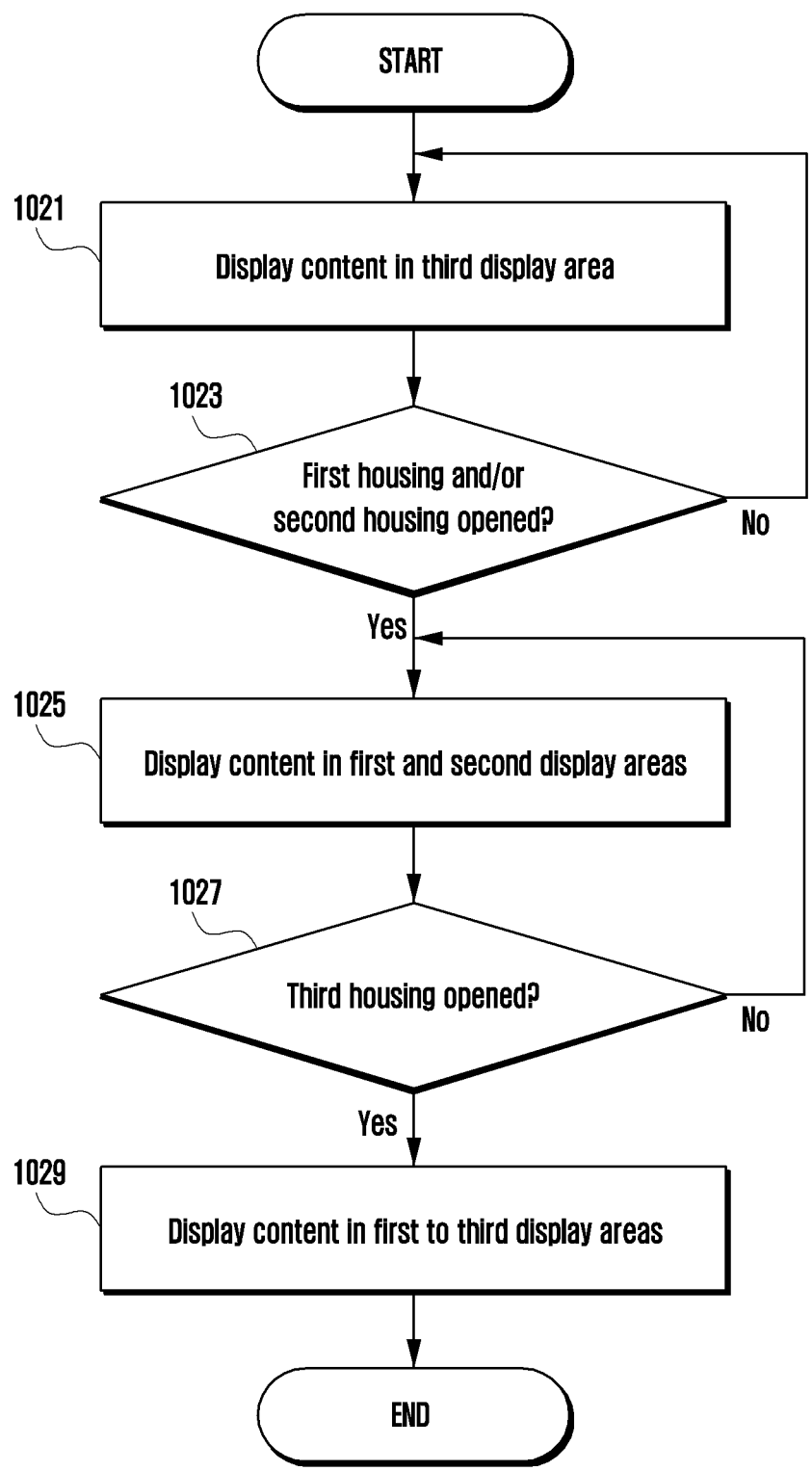
FIG. 10C is a flow chart illustrating a content display operation in an unfolding operation of a foldable housing of an electronic device according to an embodiment of the disclosure.

FIG. 10C is a flow chart illustrating a content display operation in an unfolding operation of a foldable housing of an electronic device according to an embodiment of the disclosure.

Referring to FIG. 10C, according to various embodiments of the disclosure, at operation 1021, under the control of the processor 120, the electronic device 101 may display content in the third display area 263 of the third housing 213 in the folding state of the foldable housing 211, 212, and 213.

According to various embodiments of the disclosure, at operation 1023, under the control of the processor 120, the electronic device 101 may determine whether the first housing 211 and/or the second housing 212 are switched to the open or unfolding state.

According to various embodiments of the disclosure, if the electronic device 101 determines at the operation 1023 that the first housing 211 and/or the second housing 212 are switched to the open or unfolding state, it may perform operation 1025 under the control of the processor 120.

According to various embodiments of the disclosure, if the electronic device 101 determines at the operation 1023 that the first housing 211 and/or the second housing 212 maintain the folding state, it may perform the operation 1021 under the control of the processor 120.

According to various embodiments of the disclosure, when the first housing 211 and/or the second housing 212 are switched to the open or unfolding state, at operation 1025, under the control of the processor 120, the electronic device 101 may display content in the first display area 261 and/or the second display area 262. The content displayed in the first display area 261 and/or the second display area 262 may be the enlarged content 920.

According to various embodiments of the disclosure, at operation 1027, under the control of the processor 120, the electronic device 101 may determine whether the third housing 213 is switched to the open or unfolding state.

According to various embodiments of the disclosure, if the electronic device 101 determines at the operation 1027 that the third housing 213 is switched to the open or unfolding state, it may perform operation 1029 under the control of the processor 120.

According to various embodiments of the disclosure, if the electronic device 101 determines at the operation 1027 that the third housing 213 maintains the folding state, it may perform the operation 1025 under the control of the processor 120.

According to various embodiments of the disclosure, upon determination of the open or unfolding state of the third housing 213, at the operation 1029, under the control of the processor 120, the electronic device 101 may display content in at least one or more of the first to third display areas 261, 262, and 263. The content displayed in the first to third display areas 261, 262, and 263 may include the enlarged content 920 and/or the additional content 930, and an increased or enlarged amount of content display may be displayed as a visual effect.

Figure 11A:
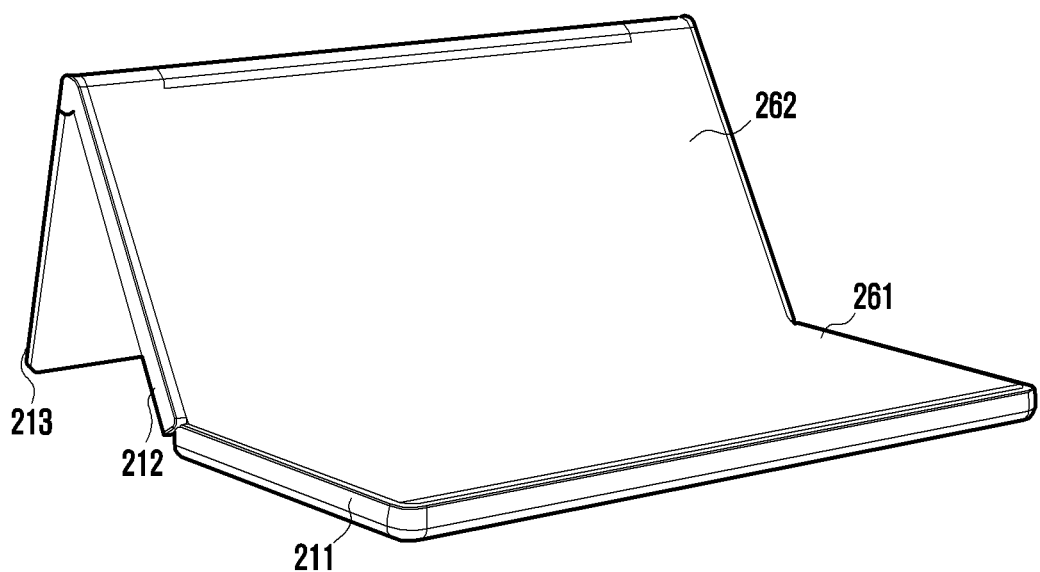
FIGS. 11A and 11B are diagrams illustrating a desktop mode of an electronic device according to various embodiments of the disclosure.
Figure 11B:
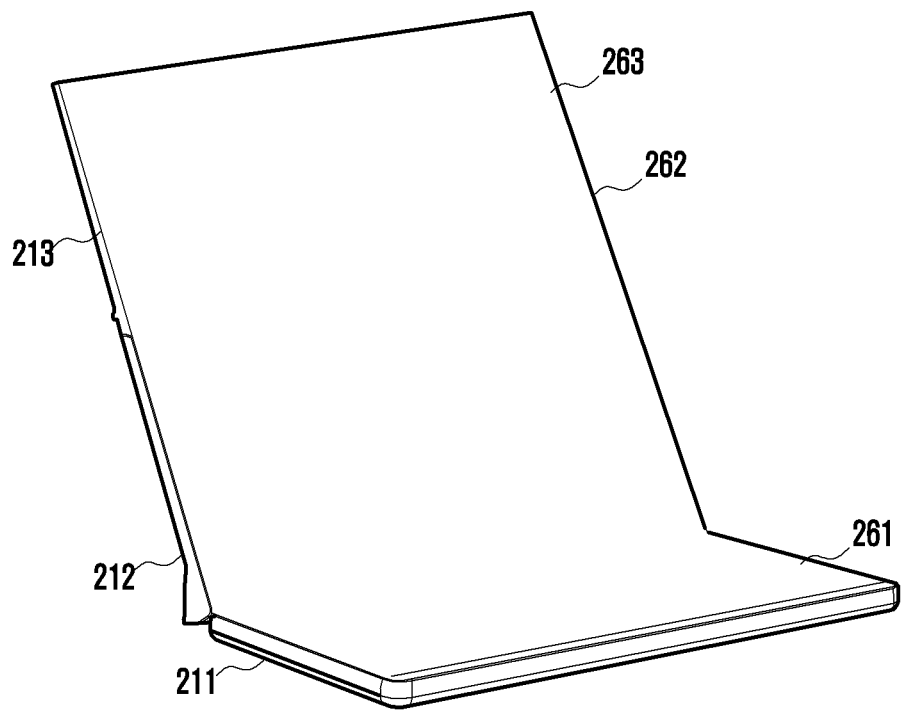

FIGS. 11A and 11B are diagrams illustrating a desktop mode of an electronic device according to various embodiments of the disclosure.

Referring to FIGS. 11A and 11B, when the first housing 211, the second housing 212, and the third housing 213 of the electronic device 101 each form a specific angle in the open state, and the posture of the electronic device 101 is detected to be a specific posture, the electronic device 101 may be switched to a desktop mode.

According to various embodiments of the disclosure, when switched to the tabletop mode, the electronic device 101 may display a clock animation in at least one of a plurality of display areas 261, 262, and 263. When switched to the desktop mode, in at least one of the plurality of display areas 261, 262, and 263, the electronic device 101 may display a keyboard/trackpad user interface, display an application execution screen, or display a duplicate of an application being displayed in a specific area.

Referring to FIG. 11A, when the first and second housings 211 and 212 are in the open state substantially from 90 degrees to a first predetermined angle (e.g., substantially 135 degrees), when the second and third housings 212 and 213 are in the open state from a second predetermined angle (e.g., substantially 10 degrees) to 90 degrees, and when the posture of the electronic device 101 is detected using the gyro sensor as the first housing 211 faces the floor, it can be switched to the desktop mode.

Referring to FIG. 11A, when the electronic device 101 is switched to the desktop mode, it may display, in at least one of the plurality of display areas 261, 262, and 263, a keyboard/trackpad user interface, display an application execution screen, or display a duplicate of an application being displayed in a specific area.

For example, when the electronic device 101 faces the floor, the keyboard/trackpad user interface may be displayed in the first display area 261 of the first housing 211 that is placed on the floor, and the application execution screen may be displayed in the second display area 262 of the second housing 212 that is erected and faces the user. In the third display area 263 of the third housing 213 that is erected and faces the opposite direction of the user, the application execution screen of the second display area 262 may be duplicated and displayed.

Referring to FIG. 11B, when the first and second housings 211 and 212 are in the open state substantially 90 degrees or more, when the second and third housings 212 and 213 are in the open state substantially 180 degrees or less but more than 0 degrees (in FIG. 11B, the second and third housings 212 and 213 are opened substantially 180 degrees), and when the posture of the electronic device 101 is detected using the gyro sensor as the first housing 211 faces the floor, it can be switched to the desktop mode.

With reference to FIG. 11B, when the electronic device 101 is switched to the desktop mode, it may display, in at least one of the plurality of display areas 261, 262, and 263, a keyboard/trackpad user interface, display an application execution screen, or display a duplicate of an application being displayed in a specific area.

For example, when the electronic device 101 faces the floor, the keyboard/trackpad user interface may be displayed in the first display area 261 of the first housing 211 that is placed on the floor, and the application execution screen may be displayed in the second display area 262 of the second housing 212 and/or the third display area 263 of the third housing 213 that are erected and face the user.

According to various embodiments of the disclosure, the second connecting member 232 connecting the second and third housings 212 and 213 may support a free-stop function, so that the second and third display areas 262 and 263 may be unfolded.

According to various embodiments of the disclosure, if the second connecting member 232 connecting the second and third housings 212 and 213 does not support the free-stop function, a support member (not shown) capable of supporting an unfolding operation of the second housing 212 and/or the third housing 213 may be further included. This support member (not shown) may be built in the second housing 212 and protrude when necessary.

Figure 12A:
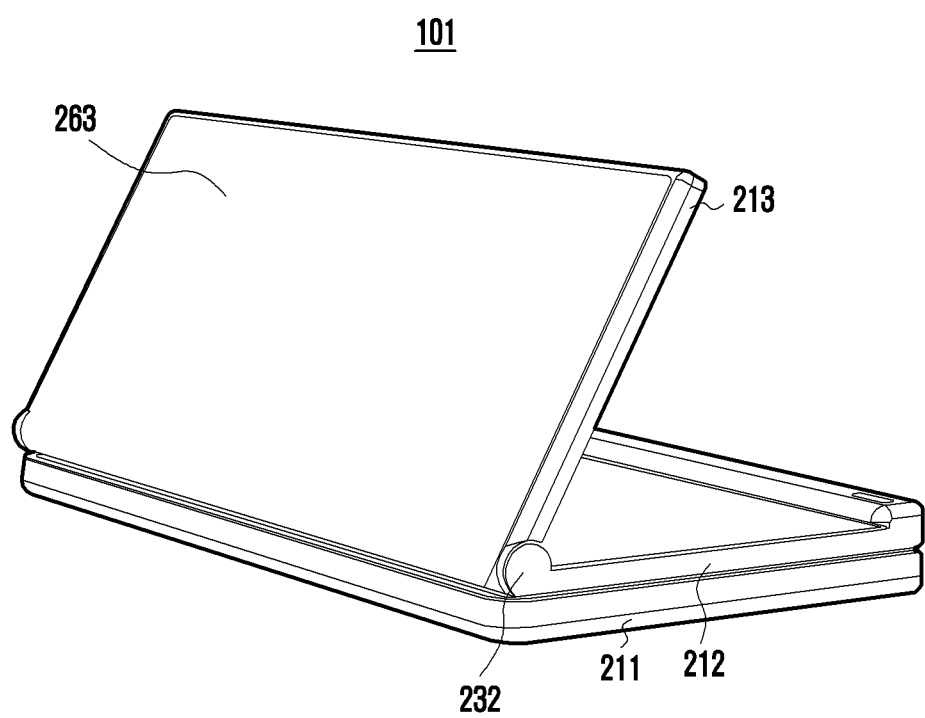
FIGS. 12A, 12B, and 12C are diagrams illustrating a desktop mode of an electronic device according to various embodiments of the disclosure.
Figure 12B:
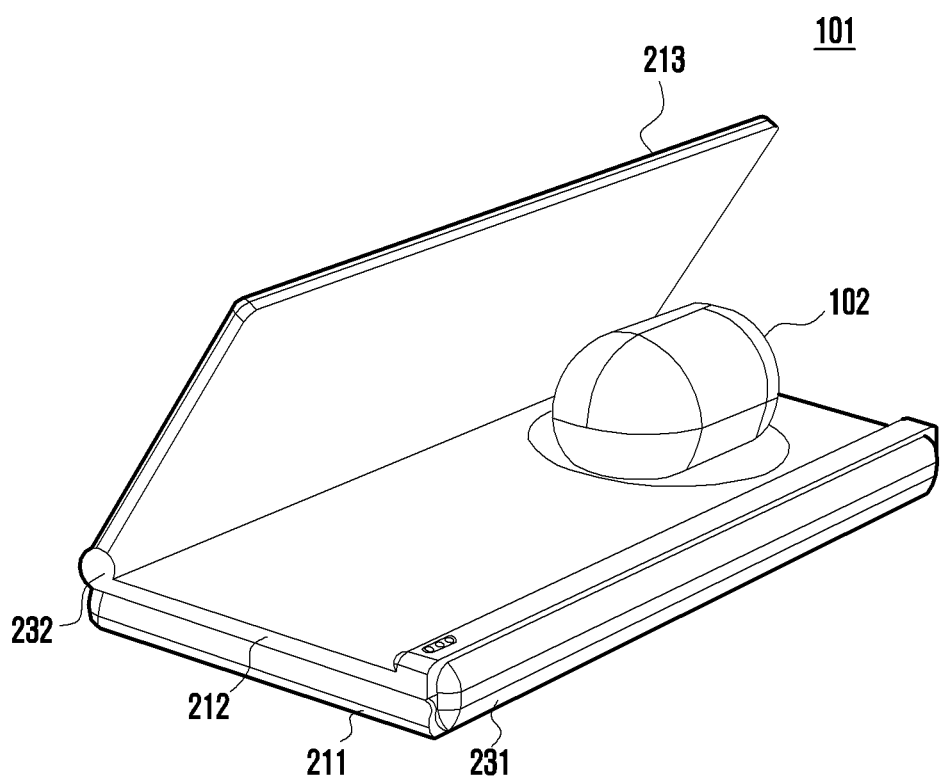
Figure 12C:
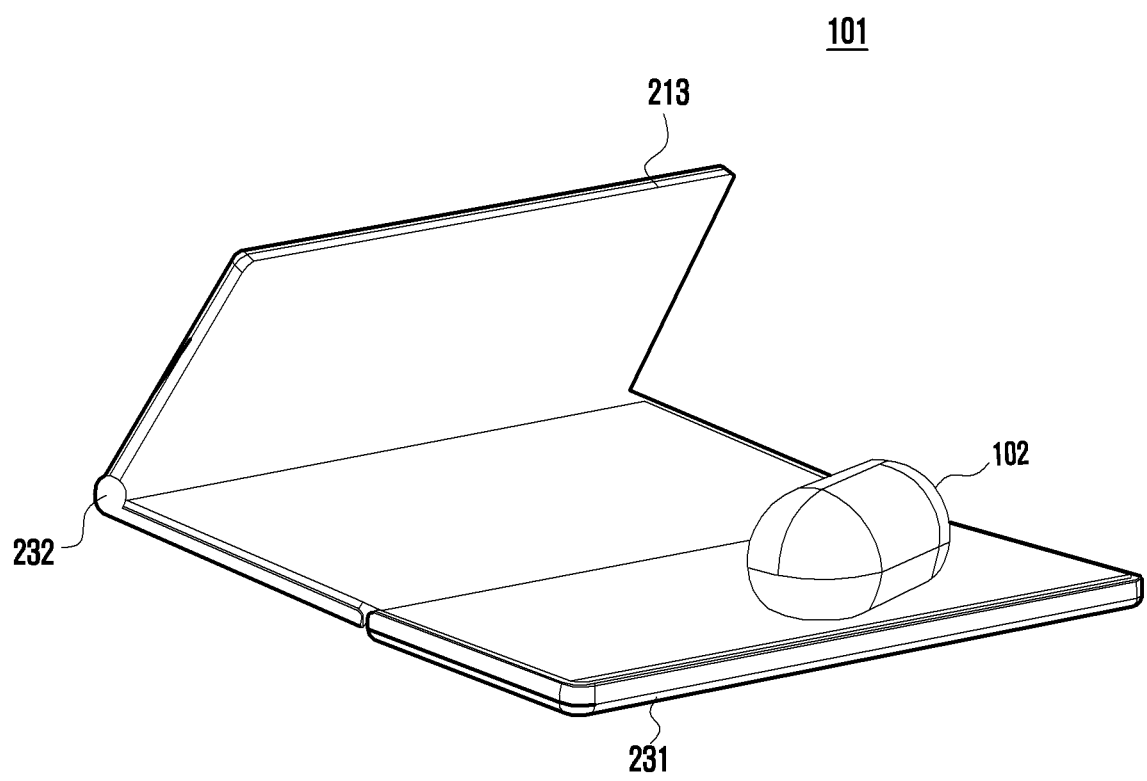

FIGS. 12A, 12B, and 12C are diagrams illustrating a desktop mode of an electronic device according to various embodiments of the disclosure.

Referring to FIGS. 12A and 12B, when the first and second housings 211 and 212 of the electronic device 101 are in the close state, when the second and third housings 212 and 213 are in the open state, and when the posture of the electronic device 101 is detected to be a specific posture, the electronic device 101 may be switched to a desktop mode.

According to various embodiments of the disclosure, when switched to the tabletop mode, the electronic device 101 may convert a currently running media player screen to a full screen mode.

Referring to FIG. 12A, when the first and second housings 211 and 212 are in the close state, when the second and third housings 212 and 213 are in the open state at substantially 90 degrees or less, and when the posture of the electronic device 101 is detected using the gyro sensor as the first housing 211 faces the floor, it can be switched to the desktop mode.

Referring to FIG. 12A, when the electronic device 101 is switched to the desktop mode, the electronic device 101 may convert the media player screen being executed in the third display area 263 to the full screen mode.

Referring to FIG. 12B, when the first and second housings 211 and 212 are in the close state, when the second and third housings 212 and 213 are in the open state at substantially 90 degrees or less, and when the posture of the electronic device 101 is detected using the gyro sensor as the first housing 211 faces the floor, it can be switched to the desktop mode.

Referring to FIG. 12C, when the first and second housings 211 and 212 are in the open state, when the second and third housings 212 and 213 are in the open state at substantially 90 degrees or less, and when the posture of the electronic device 101 is detected using the gyro sensor as the first housing 211 faces the floor, it can be switched to the desktop mode.

Referring to FIGS. 12B and 12C, in a state that the electronic device 101 is switched to the tabletop mode, a region capable of supporting wireless charging of the external electronic device 102 may be provided in at least a part of the second housing 212. With reference to FIGS. 12B and 12C, when the external electronic device 102 is placed on at least a part of the second housing 212 for wireless charging and the electronic device 101 supplies power to the external electronic device 102, the third display area 263 of the third housing 213 may display information related to power charging. The electronic device 101 may include a device (e.g., a coil) for power transfer for wireless charging of the external electronic device 102 in at least a part of the first housing 211.

Figure 13A:
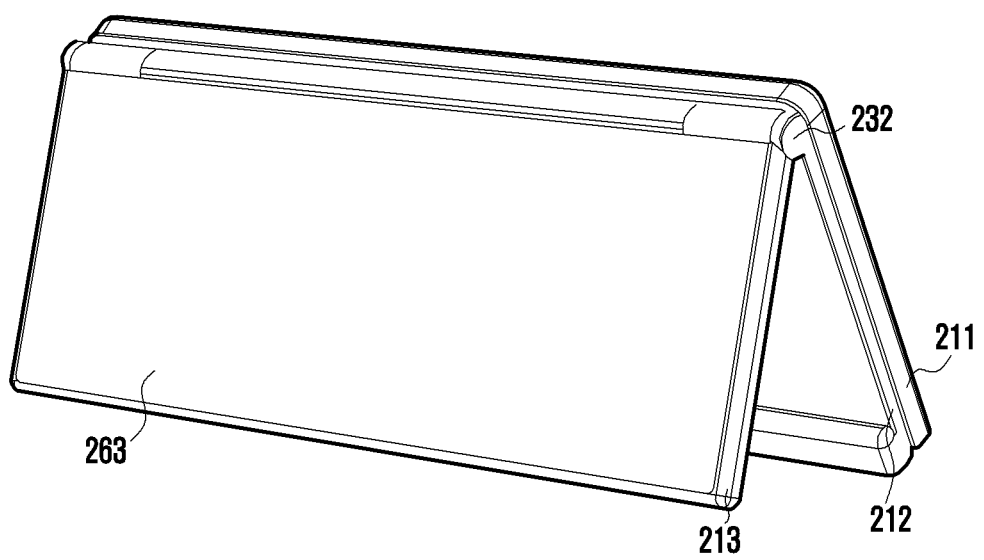
FIGS. 13A and 13B are diagrams illustrating a desktop mode of an electronic device according to various embodiments of the disclosure.
Figure 13B:
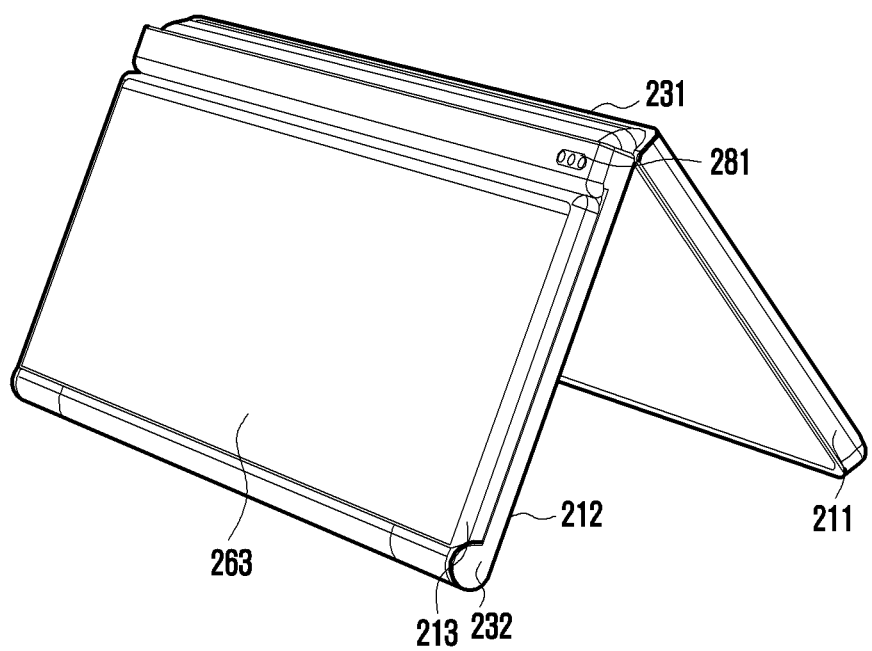

FIGS. 13A and 13B are diagrams illustrating a desktop mode of an electronic device according to various embodiments of the disclosure.

Referring to FIG. 13A, when the first and second housings 211 and 212 of the electronic device 101 are in the close state, when the second and third housings 212 and 213 are in the open state, and when the posture of the electronic device 101 is detected to be a specific posture, the electronic device 101 may be switched to a desktop mode.

Referring to FIG. 13B, when the first and second housings 211 and 212 of the electronic device 101 are in the open state, when the second and third housings 212 and 213 are in the close state, and when the posture of the electronic device 101 is detected to be a specific posture, the electronic device 101 may be switched to a desktop mode.

According to various embodiments of the disclosure, when switched to the tabletop mode, the electronic device 101 may deactivate an input of the physical button 251. According to various embodiments of the disclosure, when switched to the tabletop mode, the electronic device 101 may convert a currently running media player screen to a full screen mode.

With reference to FIG. 13A, when the first and second housings 211 and 212 are in the close state, when the second and third housings 212 and 213 are in the open state at substantially 90 degrees or less, and when the posture of the electronic device 101 is detected using the gyro sensor as the first housing 211 faces the floor, it can be switched to the desktop mode.

With reference to FIG. 13A, when the electronic device 101 is switched to the desktop mode, the electronic device 101 may deactivate an input of the physical button 251 and convert the media player screen being executed in the third display area 263 to the full screen mode.

With reference to FIG. 13B, when the first and second housings 211 and 212 are in the open state at substantially 90 degrees or less, when the second and third housings 212 and 213 are in the close state, and when the posture of the electronic device 101 is detected using the gyro sensor as the first housing 211 faces the floor, it can be switched to the desktop mode.

With reference to FIG. 13B, when the electronic device 101 is switched to the desktop mode, the electronic device 101 may deactivate an input of the physical button 251 and convert the media player screen being executed in the third display area 263 to the full screen mode.

Figure 14:
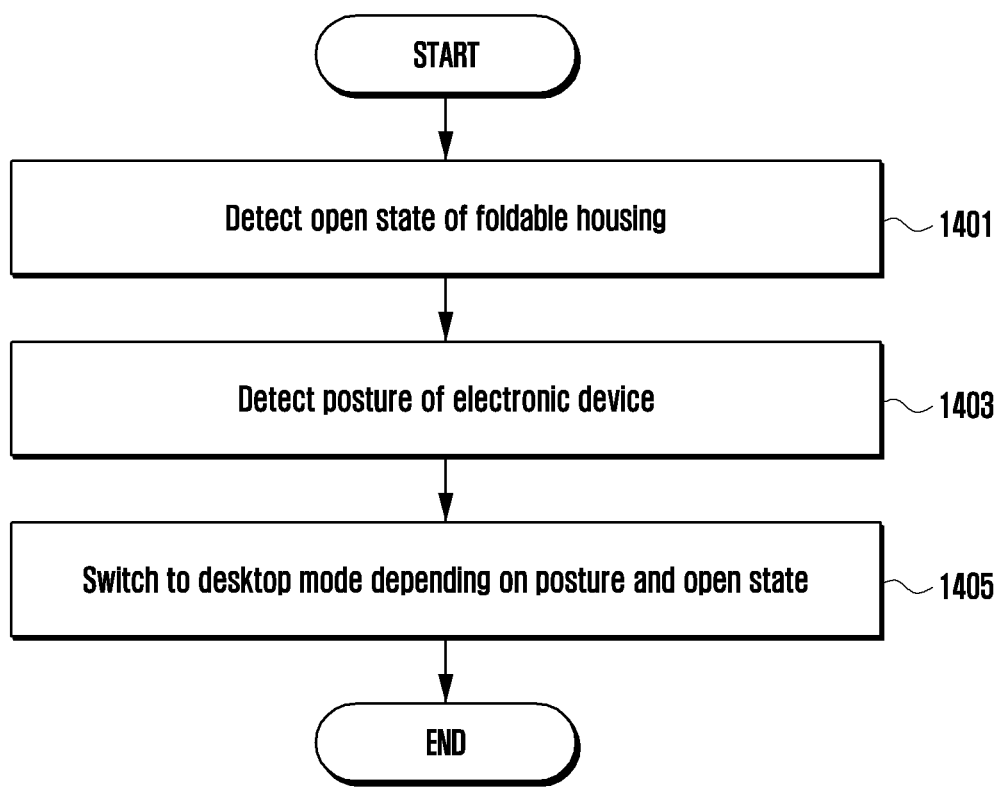
FIG. 14 is a flow diagram illustrating a method for switching a desktop mode of an electronic device according to an embodiment of the disclosure.

FIG. 14 is a flow diagram illustrating a method for switching a desktop mode of an electronic device according to an embodiment of the disclosure.

Referring to FIG. 14, according to various embodiments of the disclosure, at operation 1401, under the control of the processor 120, the electronic device 101 may detect the open state of the foldable housing 211, 212, and 213 of the electronic device 101 by using the sensor module 176.

According to various embodiments of the disclosure, at operation 1403, under the control of the processor 120, the electronic device 101 may detect the posture of the electronic device 101 by using the sensor module 176.

According to various embodiments of the disclosure, at operation 1405, under the control of the processor 120, the electronic device 101 may be switched to the desktop mode depending on the posture of the electronic device 101 and the open state of the foldable housing 211, 212, and 213. When switched to the tabletop mode, the electronic device 101 may deactivate an input of the physical button 251. When switched to the tabletop mode, the electronic device 101 may display a clock animation in at least one of the plurality of display areas 261, 262, and 263. When switched to the tabletop mode, in at least one of the plurality of display areas 261, 262, and 263, the electronic device 101 may display a keyboard/trackpad user interface, display an application execution screen, or display a duplicate of an application being displayed in a specific area. According to various embodiments of the disclosure, when switched to the tabletop mode, the electronic device 101 may convert the currently running media player screen to the full screen mode.

Figure 15:
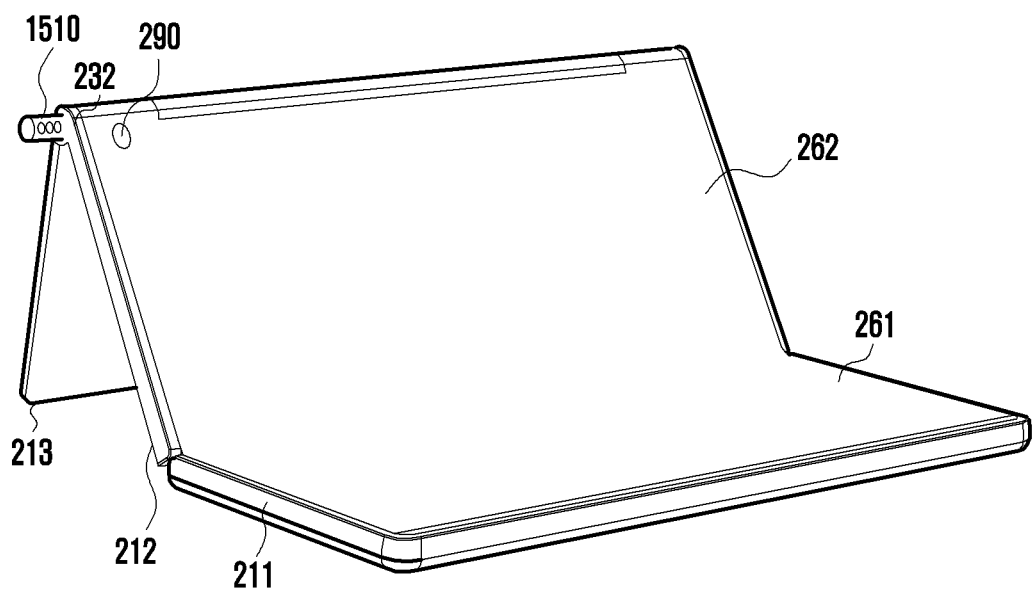
FIG. 15 illustrates a component mountable on a second connecting member according to an embodiment of the disclosure.

FIG. 15 illustrates a component mountable on a second connecting member according to an embodiment of the disclosure.

Referring to FIG. 15, according to various embodiments of the disclosure, the second connecting member 232 has a cylindrical structure having an empty space therein, and various components 1510 may be contained in the empty space.

The component 1510 according to various embodiments of the disclosure may be, for example, at least one or more of a pop-up camera, a stylus pen, a USB Type-C port, and a 3.5 pi ear jack.

An electronic device according to various embodiments of the disclosure may be one of various types of electronic devices. The electronic device may include, for example, a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" used in the disclosure may include a unit implemented in hardware, software, or firmware, and may interchangeably be used with other terms, for example, "logic", "logic block", "part", or "circuitry", etc. A module may be a single integral component, or a minimum unit or part thereof, adapted to perform one or more functions. For example, according to an embodiment of the disclosure, the module may be implemented in a form of an application-specific integrated circuit (ASIC).

Various embodiments of the disclosure may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a foldable housing;
    a flexible display;
    at least one camera;
    memory storing instructions;
    at least one sensor; and
    at least one processor,
    wherein the foldable housing includes:
        a first housing having a first surface facing a first direction and a second surface facing a second direction opposite to the first direction, wherein the first and second surfaces are spaced apart from each other by a first length, and the flexible display is positioned on the first surface;
        a first connecting member connected to a side surface of the first housing and disposed inside the foldable housing, the first connecting member being foldable in a first rotational direction; and unfoldable in a second rotational direction;
        a second housing connected to the first connecting member and having a third surface facing the first direction and a fourth surface facing the second direction, wherein the flexible display is positioned on the third surface;
        a second connecting member having a thickness corresponding to the first length and disposed inside the foldable housing, the second connecting member being connected to a side surface of the second housing, foldable in the second rotational direction, and unfoldable in the first rotational direction; and
        a third housing connected to the second connecting member and having a fifth surface facing the first direction and a sixth surface facing the second direction, wherein the flexible display is positioned on the fifth surface, and
    wherein, in a state that the second housing and the third housing are folded so that the fourth surface and the sixth surface face each other, a distance between the third surface and the fifth surface is substantially same as the first length, wherein the at least one camera includes a first camera disposed on the second surface of the first housing, wherein a physical button is disposed on a side surface of the first housing, wherein, when the third housing is folded, the fourth surface of the second housing includes a protruding area to accommodate the third housing, and wherein a thickness of the protruding area is substantially same to a thickness of the first housing.

2. The electronic device of claim 1, wherein the second housing has a first area in which the third housing is placeable on the fourth surface when the second housing and the third housing are folded so that the fourth surface and the sixth surface face each other, wherein, in the first area, the third surface and the fourth surface are spaced apart from each other by a second length, wherein the second housing has a second area in which a second camera is disposed on at least a portion of the fourth surface, wherein, in the second area, the third surface and the fourth surface are spaced apart from each other by a third length, wherein the second length is smaller than the first length, and wherein the third length is greater than the second length.

3. The electronic device of claim 1, wherein the at least one sensor includes at least one of an acceleration sensor, a gyro sensor, and a magnet sensor, and wherein the flexible display is continuously positioned on the first surface of the first housing, the third surface of the second housing, and the fifth surface of the third housing.

4. The electronic device of claim 1, wherein the second connecting member includes a hinge structure configured to be stopped at a specific angle between 0 degrees and 180 degrees, wherein the hinge structure is a cylindrical hinge structure having a length substantially equal to the first length, and wherein the hinge structure includes a multi-joint structure and a sliding structure, the multi-joint structure having elasticity, the sliding structure being disposed inside the third housing and allowing the third housing to move closer to or away from the hinge structure in response to a folding or unfolding operation.

5. The electronic device of claim 1, wherein the first connecting member provides a folding state of the first housing and the second housing so that the first surface and the third surface face each other, wherein the first connecting member includes a bracket structure connecting the first housing and the second housing and being disposed inside the first housing and the second housing, and wherein the first connecting member further includes a hinge cover that covers foldable portions of the first housing and the second housing.

6. The electronic device of claim 1, wherein the instructions, when executed by the at least one processor individually or collectively, cause the electronic device to:

divide the flexible display into a plurality of display areas, and control a screen of each of the divided plurality of display areas, and wherein among the plurality of divided display areas:

a display area of the flexible display disposed in the first housing is configured as a first display area, a display area of the flexible display disposed in the second housing is configured as a second display area, and a display area of the flexible display disposed in the third housing is configured as a third display area.

7. The electronic device of claim 6, wherein the instructions, when executed by the at least one processor individually or collectively, cause the electronic device to:

output content to the third display area when the second housing and the third housing are in a folding state so that the fourth surface and the sixth surface face each other, and when the first housing and the second housing are in a folding state so that the first surface and the third surface face each other, and output the content to the third display area and the second display area when the second housing and the third housing are switched from the folding state to an unfolding state while the first housing and the second housing are in the folding state so that the first surface and the third surface face each other.

8. The electronic device of claim 6, wherein the instructions, when executed by the at least one processor individually or collectively, cause the electronic device is further configured to:

control to display content in the third display area of the third housing in a folding state of the foldable housing, control to display content in at least one of the first display area or the second display area when at least one of the first housing or the second housing are switched to an open or unfolding state, and control to display content in at least one of the first to third display areas upon determining that the third housing is switched to an open or unfolding state.

9. The electronic device of claim 6, wherein the instructions, when executed by the at least one processor individually or collectively, cause the electronic device to:

switch to a selfie shooting mode upon detecting that the third display area faces a user when the first housing and the second housing are in a folding state so that the first surface and the third surface face each other, and when the second housing and the third housing are in an unfolding state.

10. The electronic device of claim 6, wherein the instructions, when executed by the at least one processor individually or collectively, cause the electronic device to;

switch to a desktop mode when the first and second housings are in an open state from 90 degrees to a first predetermined angle, when the second and third housings are in an open state from a second predetermined angle to 90 degrees, and when the first housing faces a floor.

11. The electronic device of claim 6, wherein the instructions, when executed by the at least one processor individually or collectively, cause the electronic device to;

switch to a desktop mode when the first and second housings are in an open state at 90 degrees or more, when the second and third housings are in an open state at 180 degrees or less, and when the first housing faces a floor.

12. The electronic device of claim 6, wherein the instructions, when executed by the at least one processor individually or collectively, cause the electronic device to;

switch to a desktop mode when the first and second housings are in a folding state so that the first and third surfaces face each other, when the second and third housings are in an open state at a third predetermined angle or more, and when the first housing faces a floor.

13. The electronic device of claim 6, wherein the instructions, when executed by the at least one processor individually or collectively, cause the electronic device to;

switch to a desktop mode when the first and second housings are in a folding state so that the first and third surfaces face each other, when the second and third housings are in an open state from a second predetermined angle to 90 degrees, and when the first connecting member and a side surface of the third housing face a floor.

14. The electronic device of claim 6, wherein the instructions, when executed by the at least one processor individually or collectively, cause the electronic device to;

switch to a desktop mode when the second and third housings are in a folding state so that the fourth and sixth surfaces face each other, when the first and second housings are in an open state from a second predetermined angle to 90 degrees, and when the second connecting member and a side surface of the first housing face a floor.

15. The electronic device of claim 12, wherein the instructions, when executed by the at least one processor individually or collectively, cause the electronic device to:

provide a wireless charging region to at least a part of the second housing in the desktop mode in which the first and second housings are in a folding state so that the first and third surfaces face each other, in which the second and third housings are in an open state at a third predetermined angle or more, and in which the first housing faces a floor, and display a charging state of an external electronic device in the third display area when the wireless charging region is provided to the at least a part of the second housing, and when the external electronic device capable of being charged is disposed in the wireless charging region.

16. The electronic device of claim 1, wherein a second camera is disposed on the protruding area.

* * * * *